(12) United States Patent
Berger et al.

(10) Patent No.: US 8,813,496 B2
(45) Date of Patent: *Aug. 26, 2014

(54) MULTI-HEAT SOURCE POWER PLANT

(71) Applicant: Ormat Technologies Inc., Reno, NV (US)

(72) Inventors: Dov Berger, Beer Sheva (IL); Joseph Shinai, Or-Yehuda (IL); Lucien Y. Bronicki, Yavne (IL)

(73) Assignee: Ormat Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/731,714

(22) Filed: Dec. 31, 2012

(65) Prior Publication Data
US 2013/0312409 A1 Nov. 28, 2013

Related U.S. Application Data

(63) Continuation of application No. 12/414,041, filed on Mar. 30, 2009, now Pat. No. 8,341,960, which is a continuation-in-part of application No. 12/164,497, filed on Jun. 30, 2008, now Pat. No. 8,266,908.

(51) Int. Cl.
| | |
|---|---|
| *F03G 7/00* | (2006.01) |
| *B60K 16/00* | (2006.01) |
| *F01K 13/00* | (2006.01) |
| *F03G 6/00* | (2006.01) |

(52) U.S. Cl.
CPC ........................................ *F03G 6/003* (2013.01)
USPC ............. 60/641.2; 60/641.8; 60/676; 60/651; 60/671

(58) Field of Classification Search
USPC ............. 60/641.2–641.4, 641.8–641.15, 653, 60/655, 676, 651, 671, 670
See application file for complete search history.

(56) References Cited

U.S. PATENT DOCUMENTS

| | | | | |
|---|---|---|---|---|
| 3,950,949 | A | * | 4/1976 | Martin et al. ................ 60/641.8 |
| 4,099,381 | A | | 7/1978 | Rappoport |
| 4,249,516 | A | | 2/1981 | Stark |
| 4,353,212 | A | | 10/1982 | Adler |
| 4,573,321 | A | | 3/1986 | Knaebel |
| 4,578,953 | A | | 4/1986 | Krieger et al. |
| 5,272,879 | A | | 12/1993 | Wiggs |
| 5,531,073 | A | | 7/1996 | Bronicki et al. |
| 5,671,601 | A | | 9/1997 | Bronicki et al. |
| 6,918,254 | B2 | | 7/2005 | Baker |
| 7,089,740 | B1 | | 8/2006 | Ou |

(Continued)

OTHER PUBLICATIONS

Alyssa Kagel, "The State of Geothermal Technology, Part II:Surface Technology". Geothermal Energy Association, www.qeo-energy.org. Jan. 2008, pp. 40-43.

*Primary Examiner* — Hoang Nguyen
(74) *Attorney, Agent, or Firm* — Oblon, Spivak, McClelland, Maier & Neustadt, L.L.P.

(57) ABSTRACT

An apparatus for increasing the efficiency of a multi-heat source power plant includes a thermal collector having access to heat from a solar collector as a heat source for heating a fluid to a first temperature; a second heat source for heating the fluid; a heat exchanger that transfers heat to the fluid which is heated to said first temperature, to raise the temperature of the fluid to a higher temperature; and a power generation cycle using the fluid, heated to the first temperature, as a motive fluid.

27 Claims, 17 Drawing Sheets

(56) References Cited

U.S. PATENT DOCUMENTS

| | | |
|---|---|---|
| 7,240,675 B2 | 7/2007 | Eickhoff |
| 7,797,940 B2 | 9/2010 | Kaplan |
| 8,266,908 B2 * | 9/2012 | Bronicki et al. ............ 60/641.1 |
| 8,341,960 B2 * | 1/2013 | Berger et al. ................ 60/641.2 |
| 2005/0072153 A1 * | 4/2005 | Baker ............................ 60/653 |
| 2009/0320473 A1 | 12/2009 | Krieger et al. |
| 2011/0209474 A1 | 9/2011 | Leibowitz |

* cited by examiner $T_1 > T_2 > T_3$
$Q_1 > Q_2 > Q_3$
$W_1 > W_2 > W_3$

MULTI-HEAT SOURCE POWER PLANT

FIELD OF THE INVENTION

The present invention relates to the more efficient utilization of low-medium temperature sensible heat source fluids in conjunction with relatively high temperature heat sources. More particularly, the invention relates to a novel method and system for utilizing low and medium temperature geothermal fluids and/or liquids from geothermal wells or alternatively unused industrial heat streams by making use of such resources together with solar energy.

BACKGROUND OF THE INVENTION

Economic exploitation of non fossil and non nuclear heat sources for power generation is dependent on the amount of heat available, its temperature and a size of power plant that can justify its erection costs as well as its operational costs. In this regard, the lower the heat source temperature, the larger the amount of heat (and consequently the bigger the heat exchangers) required for a given power output. As a consequence, the cost of the power plant per kW will be higher. In the case of geothermal energy for example, geothermal fields comprising wells producing low-temperature geothermal fluid cannot be efficiently and economically exploited to operate power plants, since the lower the enthalpy of the fluid, the more expensive the power plant becomes for a given capacity. Due to this, geothermal wells whose drilling costs are substantial are not usually exploited in such geothermal fluids. In addition, the temperature of the geothermal fluid produced by operating geothermal wells may drop after some years of operation causing a reduction of the output of the geothermal power plant as well as its possible derating by the electric utility.

Most low-temperature heat sources are in the form of sensible heat which is most efficiently used for preheating in Rankine cycle power plants. Their use for vaporizing the motive fluid at constant temperature in the power cycle is not effective (see FIG. 1). In this respect, organic fluids require less pre-heating than water/steam and thus more effectively utilize the sensible heat.

As a consequence, many low temperature heat source fluids cannot be effectively used.

As far as solar power plants are concerned, their cost is very dependent on the solar collector cost or solar collector size per kW. Furthermore, in order for solar power plants to provide continuous power, expensive storage (requiring additional solar collectors) and/or fossil fuel needs to be used.

Some methods have been devised so far to exploit low heat and thus low input from the geothermal sources in a more efficient manner. U.S. Pat. Nos. 4,578,953 and 4,700,543, the disclosures of which are hereby incorporated by reference, of Krieger and Moritz describe a plurality of independent, closed Rankine cycle power plants, each of which has a vaporizer, operated by serially applying a medium or low temperature source fluid to the vaporizers of the power plants for producing heat depleted source fluid. A pre-heater is provided for each vaporizer; and the heat depleted source fluid is applied to all of the pre-heaters in parallel. The heat depleted source fluid thus serves to heat the operating fluid to the vaporization temperature, while the source fluid applied to the vaporizers supplies the latent heat of vaporization to the operating fluid of the power plant.

Attempts in the past have been made to combine geothermal and solar energy but without addressing the issue of optimization of the specific characteristics of the respective heat sources. For instance, U.S. Pat. No. 3,950,949 discloses a method for operating a vapor cycle engine wherein a vaporizable fluid is circulated in a closed loop through a first heat source, a second heat source, an expansion vapor engine, a condenser, and back to the first heat source. The method of operation comprises the steps of heating the fluid in the first heat source to a relatively low temperature t to vaporize at least a major portion of the fluid, super-heating the fluid in the second heat source to a temperature T, supplying the fluid to the expansion vapor engine for producing power and then exhausting the expanded fluid from the engine at a temperature $T_2$ which is greater than the temperature t. This patent describes the combination of geothermal heat and solar heat in a manner which is not efficient, since the aim is to superheat the circulated fluid. To date, no practical application of this method has been made.

Another attempt to integrate geothermal and solar energy is described in U.S. Pat. No. 4,099,381 where an energy transport and conversion system is provided for conducting geothermal energy over extended distances avoiding the loss of heat by use of solar energy in order to permit efficient conversion of geothermal energy at a central thermal power station. However, the system described in this patent is impractical and expensive and, furthermore, is designed to prevent loss of existing geothermal energy, and not to exploit low enthalpy geothermal energy that would otherwise remain unexploited.

It is an object of the present invention to provide a method for exploiting low-medium temperature geothermal fluid produced by geothermal wells so that their economical exploitation can be achieved.

It is another object of the invention to provide a method for exploiting such low-medium quality geothermal fluid produced by geothermal wells by combining them with the use of solar energy in an efficient and economical manner.

It is a further object of the invention to provide a system which enables the method of the invention to be carried out.

Other objects and advantages of the invention will become apparent as the description proceeds.

SUMMARY OF THE INVENTION

According to the present invention, a method is provided for operating a multi-heat source power plant using a low-medium temperature heat source fluid, wherein said multi-heat source power plant includes a turbine or expander run by an organic motive fluid, comprising pre-heating said organic motive fluid using said low-medium temperature heat source fluid and thereafter providing further heat from an additional heat source to vaporize the motive fluid which is supplied to said turbine or expander.

Furthermore, in an embodiment of the present invention, the present invention provides an apparatus comprising a heat exchanger suitable to pre-heat an organic motive fluid with a low-medium temperature geothermal fluid, and solar energy collecting means suitable to directly or indirectly provide heat to the pre-heated organic motive fluid for heating and vaporizing said motive fluid.

In addition, in a further embodiment of the present invention, the present invention provides an apparatus comprising a heat exchanger suitable to pre-heat an organic motive fluid with a low-medium temperature unused industrial heat streams, and solar energy collecting means suitable to directly or indirectly provide heat to the pre-heated organic motive fluid for heating and vaporizing as well as superheating said motive fluid.

The present invention consequently enables the implementation of economical power plants in many sites where the use of only sensible heat at low temperatures or solar heat separately cannot be justified. This is due to too high cost of electricity produced brought about by too large an investment in heat exchangers (use of sensible heat only) and too large solar collectors (use of solar heat only) or because of too small a size of power plant (high project fixed cost and/or operating costs).

BRIEF DESCRIPTION OF THE DRAWINGS

Embodiments of the present invention are described by way of example, and with reference to the accompanying drawings wherein.

Note that similar reference numerals refer to similar components in the embodiments of the present invention described with reference to the drawings.

DETAILED DESCRIPTION OF PREFERRED EMBODIMENTS

In the context of the description of the present invention, the term "low-medium temperature" typically, but non-limiting, refers to temperatures in the range of about 160-395° F. (i.e. about 70°-200° C.).

As used herein, the term "motive fluid" refers to any fluid used to operate an expander or turbine, such as the organic fluids or steam that will be further described hereinafter. Similarly, while one of the most common examples of low-medium temperature heat source fluid is a geothermal fluid e.g. geothermal liquid or brine, which is used in the examples below, the skilled person will appreciate that any other low-medium temperature fluids can be used instead of the geothermal fluids to carry out the present invention, for the purpose of pre-heating the motive fluid. For example, spent heat is often available in many processes, such as industrial processes, as a result of intermediate heat exchange stages, or as byproducts, which can be used for this purpose. Thus, thermal oil or any other suitable fluid having a certain heat content level flowing in a continuous stream in a process can be utilized according to the present invention.

Figure 2A:
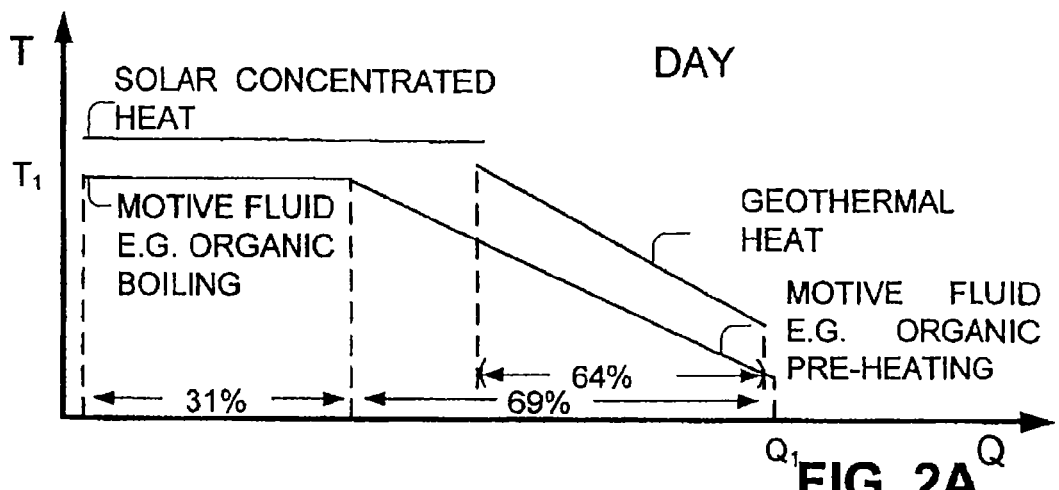
FIG. 2A is a temperature-heat diagram showing the temperature and heat characteristics of a system operating in accordance with the present invention typically around noon time.

The following detailed description will illustrate the invention. From this description a basic characteristic of the invention will become apparent, namely that the invention allows the exploitation of a substantial amount of the heat coming from solar energy for boiling, and in some cases essentially all of such solar energy heat is used for that purpose. In certain cases a small or even negligible amount of the solar energy heat is used for pre-heating the motive fluid, in addition to the solar energy heat used for vaporizing or boiling the motive fluid. Accordingly, as will be apparent to the skilled person, the invention allows an efficient exploitation of both low or medium energy heat coming from a source, such as geothermal fluid or the like, which is available on a continuous basis, and of the solar energy which is available during daytime only (see FIG. 2A). In FIG. 2A, the heat transfer characteristics of the present invention are shown (at around noon time during summer) and it can be seen that substantially good heat source-heat sink (motive fluid) matching is achieved by the present invention. I.e., according to the present invention, low-medium temperature fluid, e.g. geothermal fluid, etc. is used in the low temperature pre-heating portion of the power cycle (providing approximately 64% of the pre-heating of the organic motive fluid which is a substantial portion of the heat required to operate the power plant), while a substantial amount of the relatively high temperature solar concentrated heat is used for boiling the motive fluid.

Figure 3:
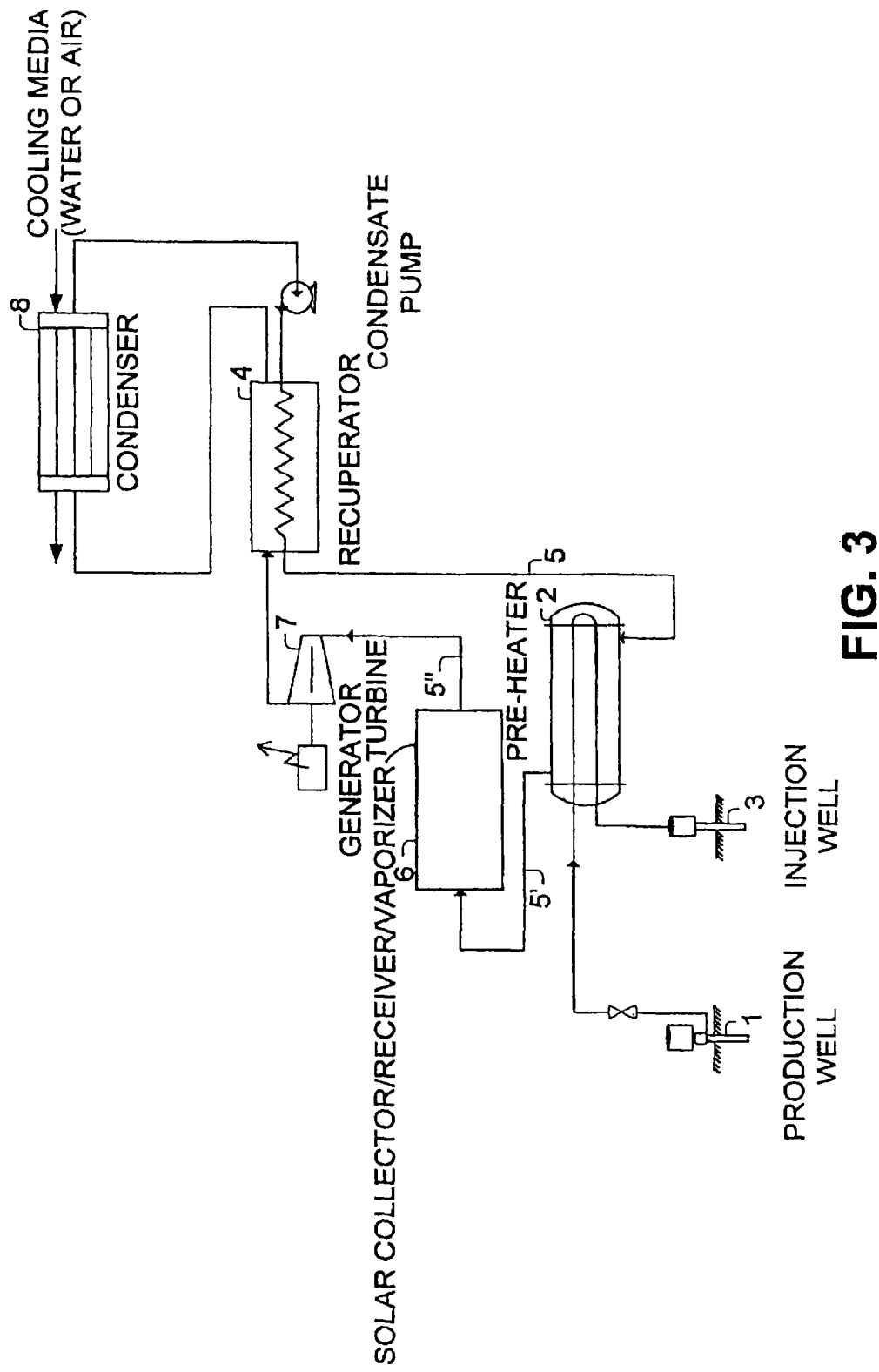
FIG. 3 is a schematic diagram of a system constructed and arranged in accordance with a preferred embodiment of the invention, in which the motive fluid is vaporized directly by solar energy.

FIG. 3 is a simplified drawing of a system constructed and arranged in accordance with a preferred embodiment of the present invention. Production well 1 supplies geothermal fluid, usually geothermal liquid or brine, to pre-heater 2. The cooled geothermal fluid is disposed of in injection well 3. The organic motive fluid supplied from condenser 8, either directly or through recuperator 4 via line 5 is pre-heated in pre-heater 2 using the geothermal fluid and the pre-heated motive fluid leaves the pre-heater through line 5' and is fed to solar collector/vaporizer 6 where it is heated and vaporized or boiled. Vaporized motive fluid produced is supplied through line 5" and fed to turbine 7 where it expands and produces electric power by driving an electric generator. Spent vaporized motive fluid exits turbine 7 and is supplied through recuperator 4, where the spent vaporized motive fluid heats motive fluid condensate, to condenser 8 for producing motive fluid condensate using air or water as the cooling medium. The motive fluid condensate is then supplied to the recuperator and the cycle is repeated.

The following numeric example will illustrate the operation of the system shown in FIG. 3. Geothermal fluid from production well 1, at 320° F. (160° C.) flows at a flow rate of 908,000 lb/hr (412,000 kg/hr) to pre-heater 2 from where it is disposed of in the re-injection well 3 at a temperature of 175° F. (about 79° C.). Motive fluid flows from condenser 8 through recuperator 4 where it reaches a temperature of 150° F. (about 65° C.) and, after being pre-heated in pre-heater 2 is supplied to solar collector 6 at a temperature of 310° F. (about 155° C.). A small portion of the solar energy is used to heat the motive fluid from 310° F. (about 155° C.) to about 345° F. (173.5° C.), at which temperature it is vaporized or boiled and the vaporized motive fluid produced is fed to the turbine for producing electric power. Spent vaporized motive fluid is supplied from the turbine through the recuperator and fed to the condenser. Motive fluid condensate leaving condenser 8 is pumped at a temperature of 95° F. (35° C.) to the recuperator. Under these operating conditions, the power produced is about 16,000 kW gross.

Figure 4:
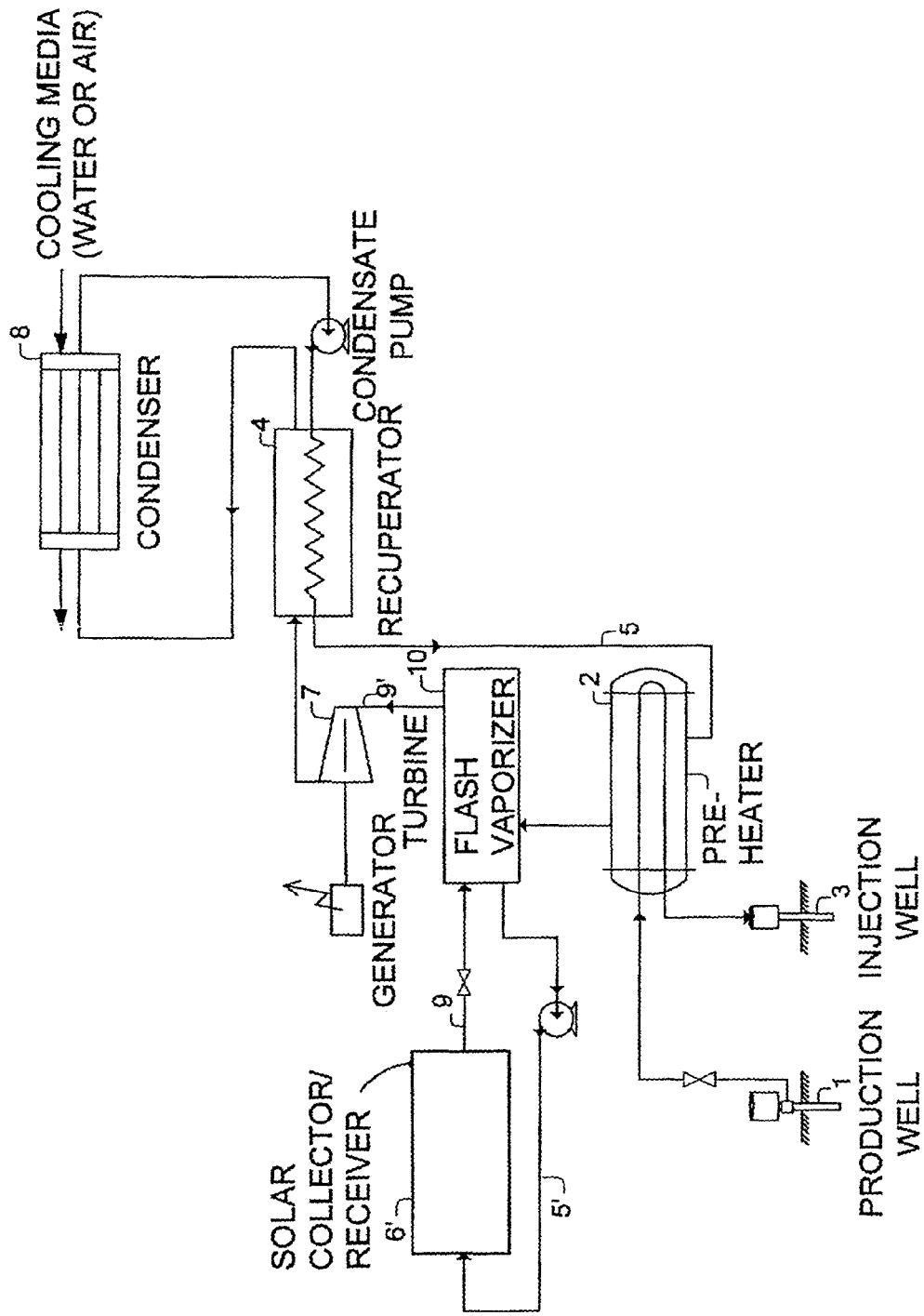
FIG. 4 is a schematic diagram of an alternative system constructed and arranged in accordance with another preferred embodiment of the invention, using a flash vaporizer.

FIG. 4 is a variant of the system of FIG. 3, and the same numerals are used to indicate elements that are identical in both cases. The following differences exist between the two systems: according to this embodiment, the organic motive fluid is not vaporized in the solar collector, but rather the liquid motive fluid is heated in solar collector/receiver 6' and the heated liquid motive fluid is supplied, through line 9 to flash vaporizer 10 where it is allowed to flash and vaporize. The vaporized motive fluid produced leaves the flash vaporizer through line 9' and is supplied to turbine 7 for producing electric power. In this embodiment, solar collector 6' does not require to be coupled with a vaporizer, which can be provided separately.

Figure 2B:
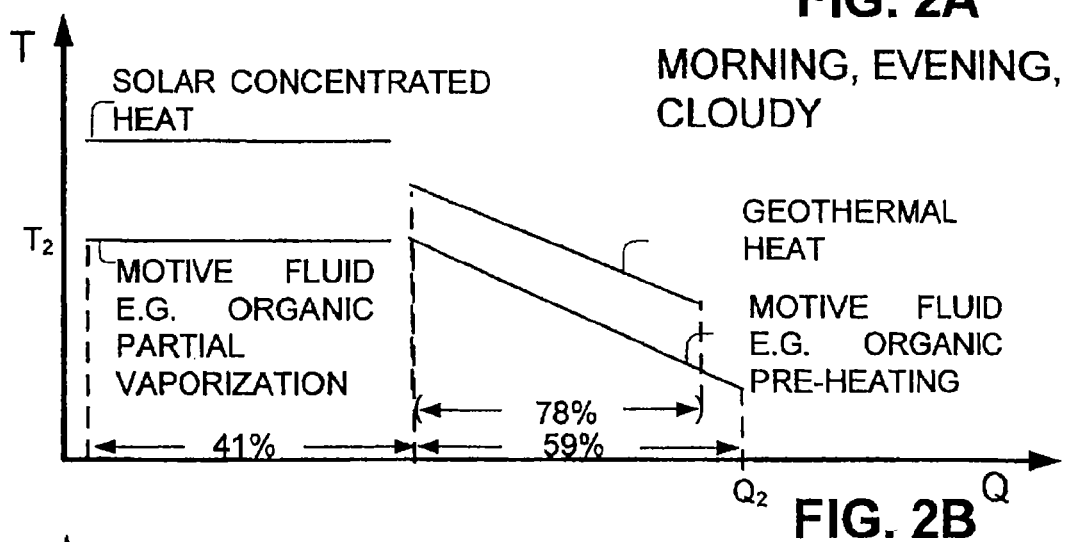
FIG. 2B is a temperature-heat diagram showing the temperature and heat characteristics of a system operating in accordance with the present invention during early morning and late afternoon hours.

In order to appreciate one of the numerous advantages of the invention, it should be understood how the system of FIG. 4 operates during different portions of the day. The operation of the system can be essentially divided into four separate times: full sunlight, decreasing sunlight, increasing sunlight and night-time. During full sunlight (e.g. at around noon time during summer), operation will proceed in a manner similar to that described with reference to FIGS. 3 and 4 with vaporized motive fluid produced in e.g. flash vaporizer 10 (see FIG. 4) being supplied to turbine 7 for producing electric power (see also FIG. 2A). However, as the day progresses toward evening e.g. late afternoon hours e.g. about 6:00 p.m., the amount of energy supplied by the sun constantly decreases. A similar situation also occurs when a sunny sky becomes cloudy. The temperature of the motive fluid leaving the pre-heater does not substantially change because the heat provided by geothermal fluid or liquid produced by production well 1 is substantially constant. Assuming that the system operates such that the motive fluid is brought to its vaporization temperature in pre-heater 2 at the operating pressure of vaporizer 10, then only the heat of vaporization is supplied by solar collector 6'. As the amount of energy supplied by solar collector 6' decreases, the pressure in vaporizer 10 is reduced by a pressure controller (not shown), permitting the motive fluid to vaporize in spite of the reduced energy input. The pressure is thus reduced as a function of the level of the solar energy input. FIG. 2B shows the heat transfer characteristic of the present invention at such hours. Usually, the low temperature pre-heating carried out here will commence at a higher temperature than that carried out in the system operating under the conditions described with reference to FIG. 2A since, at such times, not all of the motive fluid is vaporized, see the description relating to FIG. 4 above. FIG. 2B shows that reasonably good heat source-heat sink (motive fluid) matching is still achieved at such hours. Under such conditions geothermal fluid provides approximately 78% of the pre-heating of the organic working fluid and as will be explained below a power level of 9.2 MW gross electric power is still produced.

Figure 2C:
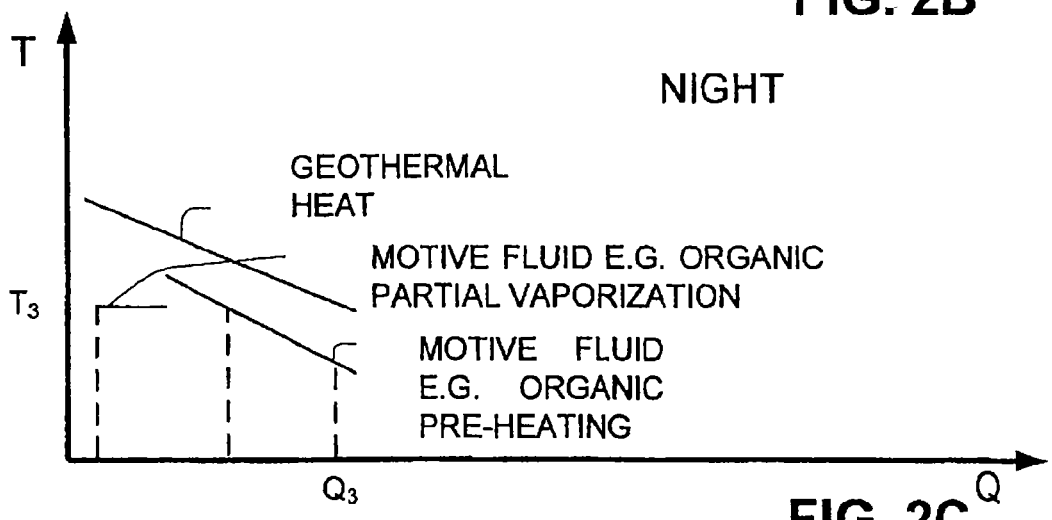
FIG. 2C is a temperature-heat diagram showing the temperature and heat characteristics of a system operating in accordance with the present invention during night time.

At night-time, the system operates at the lowest operating pressure of vaporizer 10, since heat is provided only by geothermal fluid or liquid produced from production well 1. FIG. 2C show heat transfer characteristics of the present invention during such night-time hours. On the other hand, in the early morning hours, e.g. about 7:00 a.m., when some solar radiation begins to be collected in the solar system, the amount of heat added by it increases once again and the operating pressure in vaporizer 10 increases accordingly. FIG. 2B shows that reasonably good heat source-heat sink (motive fluid) matching is still achieved at such early morning hours. Of course, similar changes may occur during the day, as explained above, as a result of atmospheric conditions, and the system responds to such changes in the same manner. Thus, the present invention provides operation even when the intensity of the solar energy drops or even is not present (e.g. at night).

The following numeric example will illustrate the operation of the system of FIG. 4. At e.g. early morning hours, about 7:00 a.m. in the summer, a motive fluid temperature of about 345° F. (173.5° C.) is achieved at the exit of solar collector 6'. Thereafter, this heated motive fluid is supplied to flash vaporizer 10 where vaporized motive fluid is produced and is supplied to turbine 7 at a temperature of about 357° F. (160.8° C.) so that 11.5 MW gross electric power is produced. On the other hand, at 6:00 p.m. in the late afternoon towards evening in summer, a motive fluid temperature of about 305° F. (151.2° C.) is achieved at the exit of solar collector 6' so that 9.2. MW gross electric power is produced. Consequently, it can be seen that even during such early hours of the day and late hours of the day, a substantial amount of power is produced although the level of solar radiation is relatively low [29.5 MW$_t$ (thermal) at 7:00 a.m., 23.1 MW$_t$ (thermal) at 6:00 p.m., compared to 39.6 MW$_t$ (thermal) at 12:00 noon (when 16 MW gross electric power is produced)].

FIGS. 2A and 2B as well as the numerical examples demonstrate that the preferred use, according to the present invention, of an organic motive fluid enhances the amount of heat involved in the pre-heating of the motive fluid with geothermal fluid (or other low-energy fluid). Furthermore, FIG. 1 also shows, that the preferred use of an organic motive fluid rather than water provides an increase in the power level produced by a power plant operating in accordance with the present invention.

Figure 5:
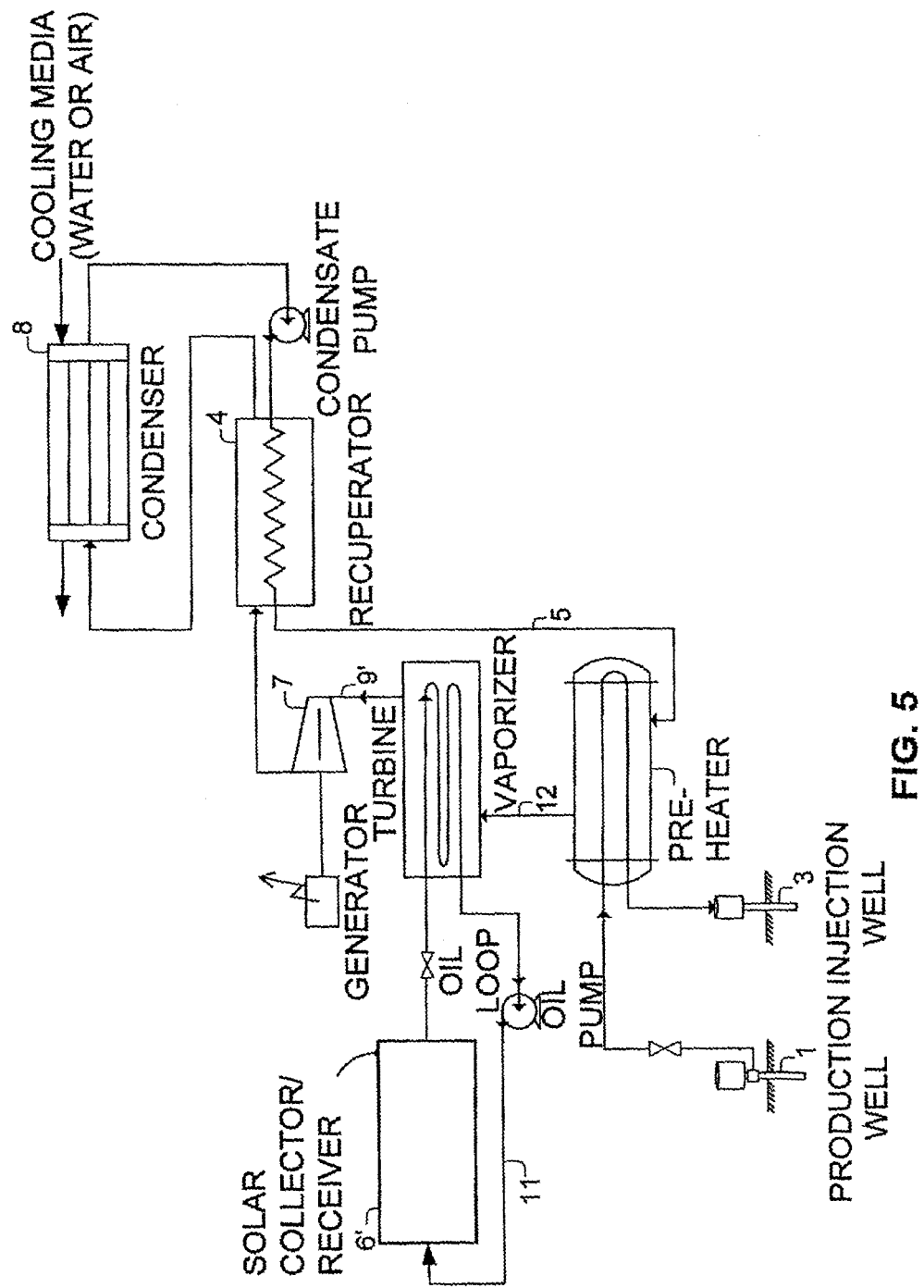
FIG. 5 is a schematic diagram of still another alternative system constructed and arranged in accordance with a further preferred embodiment of the invention, which utilizes thermal oil to heat the organic motive fluid and vaporize the organic motive fluid.

Turning to FIG. 5, a system is shown, which differs from the previous embodiments since the organic motive fluid is not directly heated in the solar collector; rather, solar collector 6" heats thermal oil, flowing in a closed heat transfer loop indicated in the figure by reference numeral 11, which heats the pre-heated organic motive fluid (flowing into vaporizer 10' through line 12). According to the system of the present embodiment, the heat exchanger used for heating the pre-heated organic motive fluid with thermal oil is incorporated in vaporizer 10'. The vaporized motive fluid produced in vaporizer 10' exits through line 9' and is supplied to turbine 7 for producing electric power. In the present embodiment, solar collector 6", shown in FIG. 5, will be larger than solar collectors 6 and 6' shown in FIGS. 3 and 4 respectively.

The following numeric example will illustrate the operation of the system described with reference to FIG. 5. It is assumed that the geothermal fluid is supplied from production well 1 at a temperature of 320° F. (160° C.) and at a flow rate of 908,000 pounds per hour (412,000 kg/hr). After pre-heating the organic motive fluid to a temperature of 310° F. (about 155° C.), the geothermal fluid leaves the pre-heater at 175° F. (about 79° C.).

Figure 1:
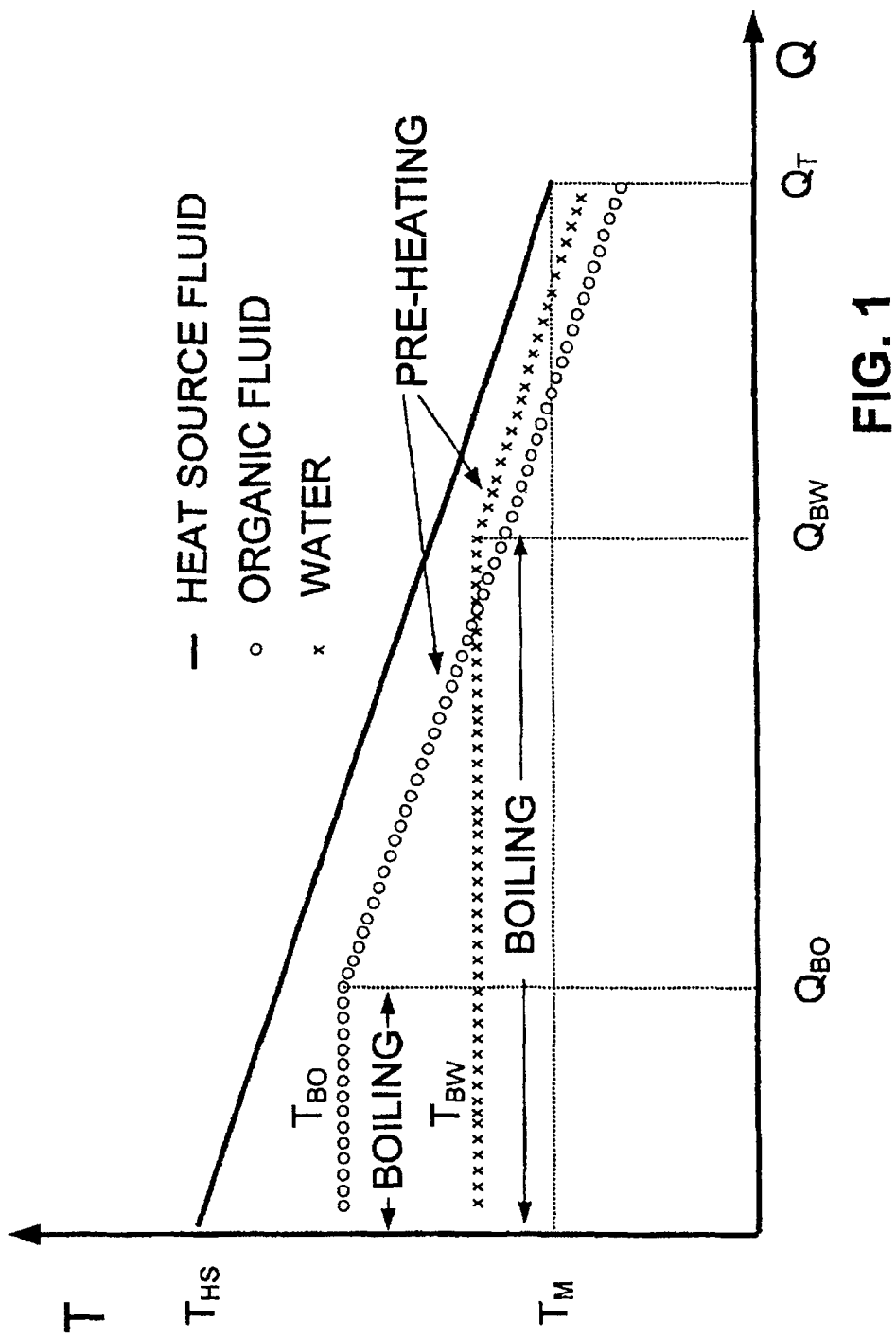
FIG. 1 is a temperature-heat diagram showing the temperature and heat characteristics of a system operating with an organic motive fluid compared to a system operating on water as its motive fluid, the heat source being e.g. geothermal brine or liquid having substantial amount of sensible heat.

Thermal oil is heated in solar collector 6" to about 445° F. (about 230° C.), at which temperature it is fed to vaporizer 10' for producing organic motive fluid vapor (which in this example is n-pentane) at a temperature of about 345° F. (173.5° C., usually geothermal liquid or brine), the organic motive fluid vapor produced being supplied thereafter to turbine 7. The thermal oil leaves vaporizer 10' at about 355° F. (about 180° C.). Cooling water, if used, is fed to condenser 8 at a temperature of 21° C. and leaves at 30° C. while the temperature of the motive fluid condensate leaving the condenser is 95° F. (35° C.). Recuperator 4 heats the motive fluid condensate to 150° F. (about 65° C.). Under these operating conditions, the electric power produced is 16,000 kW gross. It is to emphasized the FIGS. 1, 2A and 2B are also descriptive of the operation of the present embodiment of the invention. During night-time, see FIG. 2C, a further vaporizer (not shown) would be used in the present embodiment of the invention to which geothermal fluid would be supplied (for vaporizing motive fluid) in addition to the geothermal fluid supplied to pre-heater 2.

Figure 6:
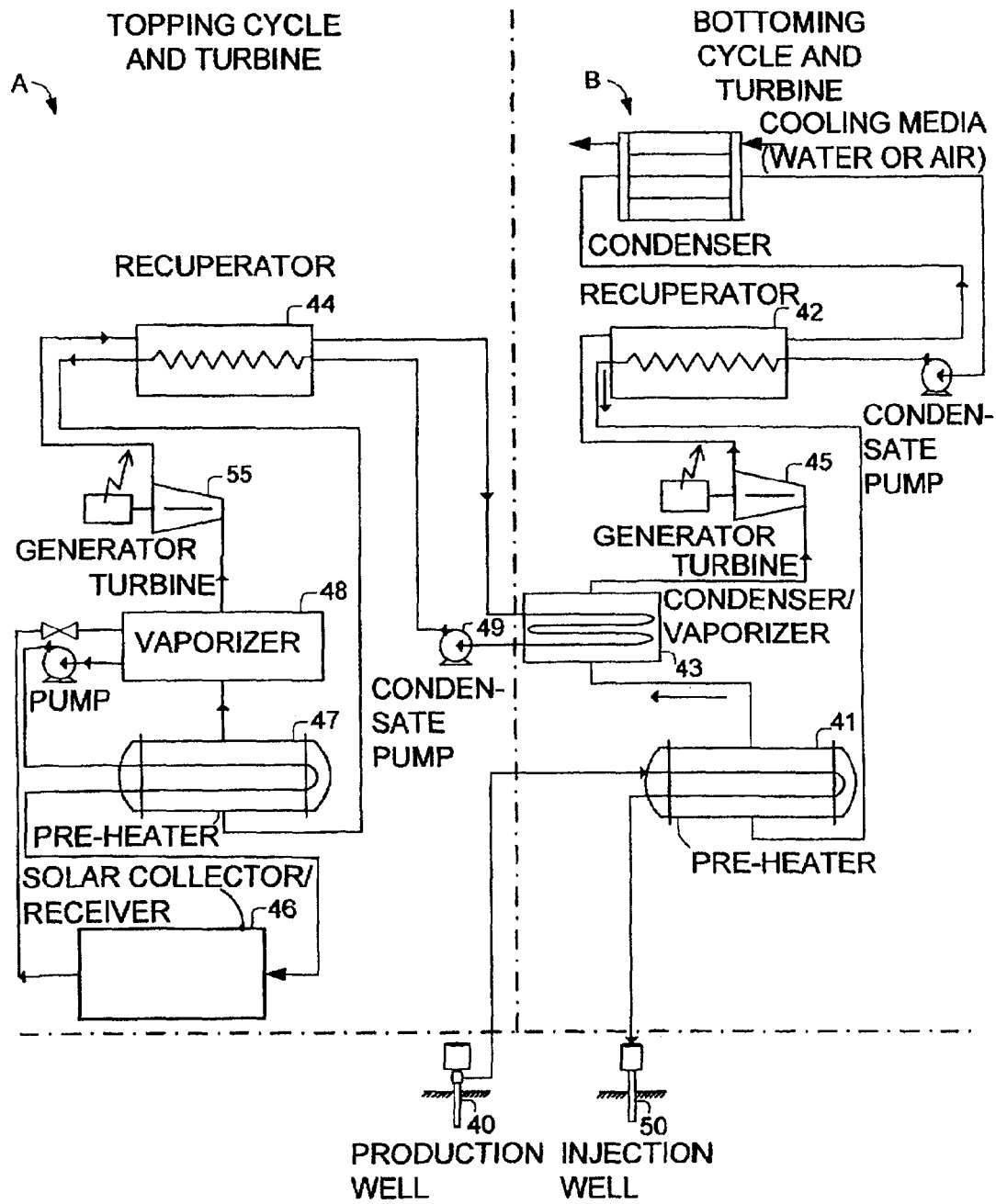
FIG. 6 is a schematic diagram illustrating an alternative arrangement constructed and arranged in accordance with an embodiment of the present invention in which heat from geothermal fluid produced by a geothermal production well is used to pre-heat the motive fluid and solar energy is used to provide not only heat for vaporizing the motive fluid but also for operating an additional power plant.

Referring now to FIG. 6, geothermal fluid, usually geothermal liquid or brine, is fed from production well 40 to pre-heater 41, where motive fluid supplied from a condenser through recuperator 42 is pre-heated and then fed to vaporizer 43. Vaporizer 43 receives heat from a separate power cycle using motive fluid supplied from recuperator 44 in the separate power cycle. Motive fluid vapor produced in vaporizer 43 is fed to turbine 45 for producing electric power.

In this embodiment, a separate power cycle, a topping cycle, designated A, operates such that a separate motive fluid is heated using solar heating system 46. In the example described with reference to FIG. 6, the motive fluid in separate cycle A, supplied from recuperator 44, is first pre-heated in pre-heater 47 and solar system 46 supplies heat of evaporation (as well as additional heating, if required) so that motive fluid vapor is produced in vaporizer 48. Subsequently, the motive fluid vapor is supplied to turbine 55 for producing electric power. The cycle of separate topping cycle A is completed when the expanded motive fluid vapor from turbine 55 is fed to condenser/vaporizer 43 via recuperator 44 for producing motive fluid condensate.

As can be seen from FIG. 6, condenser/vaporizer 43 provides heat for vaporizing or boiling the motive fluid, pre-heated by geothermal fluid supplied from production well 40 in bottoming cycle designated B. In condenser/vaporizer 43, heat produced by condensation of the motive fluid of separate topping cycle A provides the heat for vaporizing the motive fluid of the bottoming cycle pre-heated by the geothermal fluid. In such a manner, efficient heat transfer matching is achieved. Furthermore, this embodiment is particularly useful when the temperature that can be achieved in solar system 46 is relatively high, e.g. about 290° C. at the outlet of solar system 46. If preferred, pre-heating in topping cycle A can be carried out using geothermal fluid (not shown).

In a numerical example of the embodiment of the present invention described with reference to FIG. 6, it is assumed, here also, that the geothermal fluid is supplied at a temperature of 320° F. (160° C.), from production well 40 at a flow rate of 908,000 pounds per hour (412,000 kg/hr) to pre-heater 41. After transferring heat to the organic motive fluid in the pre-heater which reaches a temperature of 310° F. (about 155° C.), the geothermal fluid leaves the pre-heater at 175° F. (about 79° C.). Vaporizer/condenser 43 produces organic motive fluid vapor which exits at about 345° F. (173.5° C.) and is supplied to turbine 45 for producing electric power e.g. at a level of about 16,000 kW gross. Cooling water, if used, is fed to the condenser at a temperature of 21° C. and leaves at 30° C. while the temperature of the motive fluid condensate leaving the condenser is 95° F. (35° C.). The recuperator heats the motive fluid condensate to 150° F. (about 65° C.).

In the topping cycle, liquid is heated in the solar collector to approximately 554° F. (290° C.), at which temperature it is fed to vaporizer 48, liquid being fed to pre-heater 47 at about 465° F. (240° C.). The organic motive fluid vapor produced in vaporizer 48 is supplied to turbine 55 for producing electric power. Spent motive fluid vapor existing the turbine is supplied to recuperator 44 and thereafter to vaporizer/condenser 43 at a temperature of 383° F. (195° C.). Motive fluid condensate produced therein is supplied back to pre-heater 47 using cycle pump 49 through recuperator 44. Under these operating conditions the electric power produced by topping cycle A is 4025 kW gross. Consequently, in this embodiment, a higher power output is achieved than previous embodiments described herein while operating at a similar efficiency level.

When water is used as the motive fluid in topping cycle A, if preferred, the power plant can be simplified by not using recuperator 44, while recuperator 42 and pre-heater 41 in bottoming cycle B can also not be used. In this option, the geothermal fluid, usually geothermal liquid or brine, can be supplied to pre-heater 47 of topping cycle A and solar collector/receiver 46 can used to provide heat to vaporizer 48 without supplying heat to pre-heater 47.

Figure 6A:
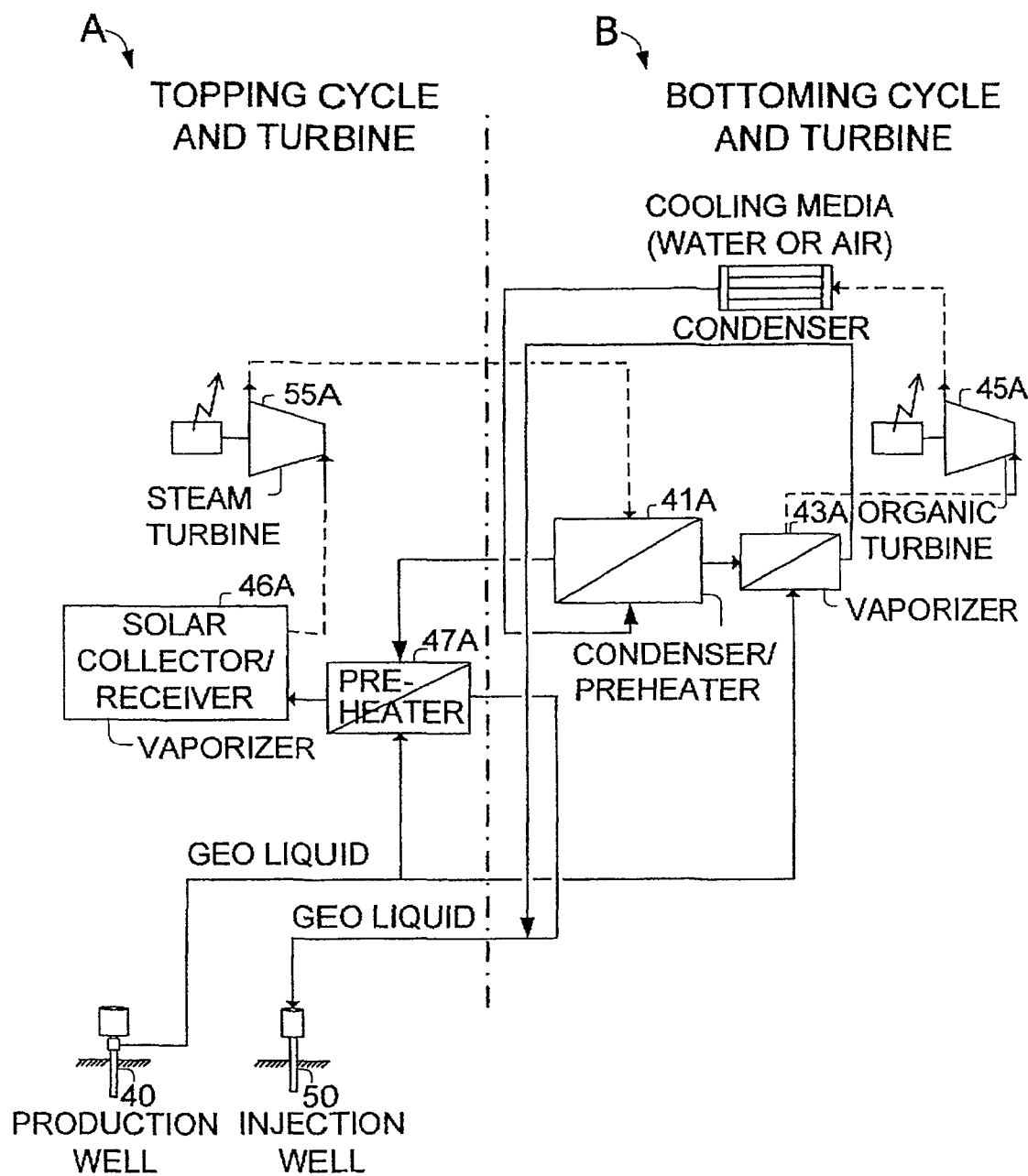
FIG. 6A is a schematic diagram illustrating an alternative arrangement constructed and arranged in accordance with an embodiment of the present invention in which heat from geothermal fluid produced by a geothermal production well is used to pre-heat the motive fluid vaporized by solar energy for one power plant while motive fluid exiting the turbine or expander of this power plant is used to pre-heat the motive fluid of a bottoming cycle power plant wherein heat from the geothermal fluid is used for vaporizing the motive fluid of this bottoming cycle power plant.

A further alternative of a combined cycle power plant is described with reference to FIG. 6A in which optimization of the use of solar heat and geothermal heat has been made and in which water is also used as the motive fluid for the topping turbine power cycle and an organic fluid used as the motive fluid in the bottoming power cycle. In the topping power cycle, heat from geothermal fluid is used to pre-heat the water motive fluid in pre-heater 47A and solar radiation is used for vaporizing the water and producing steam in solar collector/receiver/vaporizer 46A. Steam produced thereby is supplied to steam turbine 55A where it expands and power is produced preferably using the electric generator coupled thereto. The expanded steam exiting the steam turbine is supplied to condenser/pre-heater 41A (of the bottoming cycle) where it condenses and the steam condensate produced is returned to pre-heater 47A completing the topping power cycle A. In bottoming power cycle B, pre-heated organic motive fluid exiting condenser/pre-heater 41A is supplied to vaporizer 43A where heat from geothermal fluid vaporizes the organic motive fluid. The organic motive fluid vapor is supplied to organic motive fluid turbine 45A where it expands and produces power preferably by use of the electric generator coupled thereto. Expanded organic motive fluid exiting organic motive fluid turbine 45A is supplied to condenser cooled by a cooling medium e.g. water or air and the organic motive fluid condensate produced is supplied to condenser/pre-heater 41A thus completing bottoming power cycle B.

In a numerical example providing an indication of the operation characteristics of the embodiment of the invention described with reference to FIG. 6A, geothermal fluid in the form of geothermal liquid or brine at 171° C. pre-heats the water motive fluid to 155° C. in pre-heater 47A and thereafter the pre-heated water motive fluid is vaporized in solar collector/receiver/vaporizer 46A producing steam at 270° C. This steam is expanded in steam turbine 55A and the electric generator coupled thereto produces 17.4 MW (gross power) of electric power. Expanded steam exits the steam turbine at 102° C. and is supplied to condenser/pre-heater 41A where steam condensate is produced at 55° C. which is then returned to pre-heater. In the bottoming power cycle B, organic motive fluid is pre-heated by condensing steam in condenser/pre-heater 41A to 90° C. and is supplied to vaporizer 43A wherein geothermal fluid in the form of geothermal liquid or brine heats the organic motive fluid and produces organic motive fluid vapor at 145° C. This organic motive fluid vapor is supplied to organic motive fluid turbine 45A where it expands and the electric generator driven by the organic motive fluid turbine produces 36.5 MW (gross power) of electric power. Expanded organic motive fluid vapor exiting organic motive fluid turbine 45A is supplied to the organic motive fluid condenser and cooling media (water or air) supplied thereto produces organic motive fluid condensate which is returned to pre-heater 41A. If preferred, a further organic motive fluid power plant can be used to utilize further heat present in the geothermal liquid or brine exiting vaporizer 43A to further cool it to around 80° C. and produce a further 14.7 MW (gross power) of electric power.

Figure 6B:
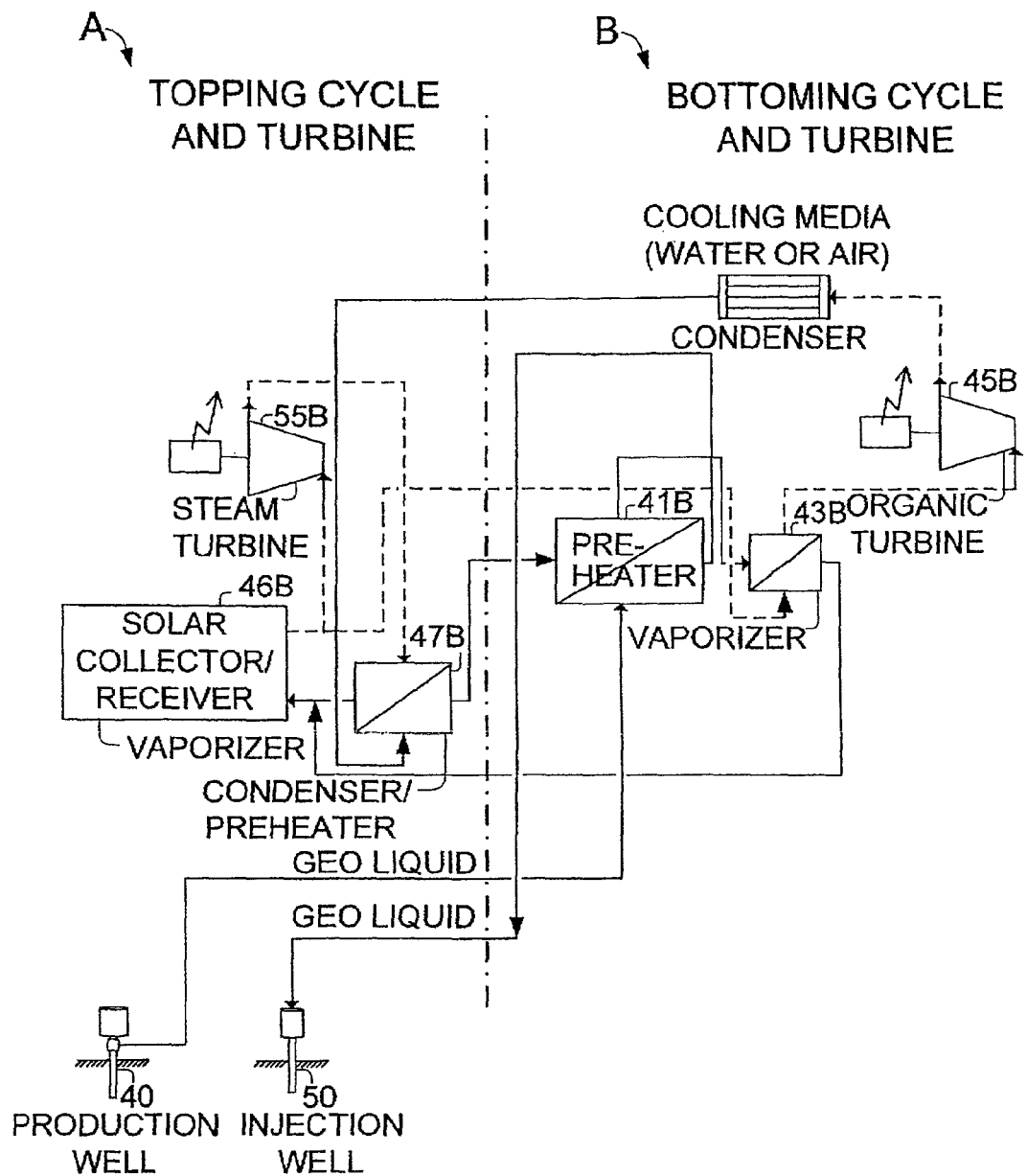
FIG. 6B is a schematic diagram illustrating a further arrangement constructed and arranged in accordance with an embodiment of the present invention wherein collected solar energy heats a motive fluid for operating a separate topping cycle power plant wherein additional power is produced in a further bottoming cycle power plant operated by an additional motive fluid.

In a further option (see FIG. 6B), portion of heat from the solar collector/receiver 46B can be used for vaporizing the organic motive fluid in vaporizer 43B in bottoming power cycle B rather than heat contained in the geothermal fluid. Here, expanded steam exiting steam turbine 55B is supplied to condenser/pre-heater 47B for pre-heating the organic motive fluid of the bottoming cycle while geothermal fluid, usually geothermal liquid or brine further pre-heats the organic motive fluid in pre-heater 41B to a higher temperature, e.g. about 151° C. The temperature of the organic motive fluid vapor supplied from solar vaporizer 43B to organic motive fluid turbine 45B in this example is 168° C. and 48.8 MW (gross power) of electric power is produced in addition to the 12.2 MW (gross power) produced by the steam turbine in the topping cycle power plant. If preferred, additional pre-heating of the organic motive fluid can be performed in an additional pre-heater (not shown). In such a case, geothermal fluid, usually in the form of geothermal liquid or brine (e.g. exiting pre-heater 41B of bottoming cycle power plant B) can be supplied to such a pre-heater prior to supplying the pre-heated organic motive fluid to condenser/pre-heater 47B for further pre-heating.

In a further arrangement or embodiment (see FIG. 6O), heat from the geothermal fluid, usually in the form of geothermal liquid or brine, is used not only for pre-heating the water motive fluid in the topping power cycle prior to supplying it to solar receiver/collector/vaporizer 46C but also for reheating expanded steam. In this option, steam produced in solar receiver/collector/vaporizer 46C is supplied to steam turbine 55C via superheater 48C also supplied with solar heat from a solar collector/receiver where it expands and produces electric power preferably using an electric generator coupled to the steam turbine. Expanded steam exiting steam turbine 55C is reheated by geothermal liquid or brine in re-heater 56C and the reheated steam is supplied to further steam turbine 57C in topping cycle power plant A for producing additional electric power (preferably using an electric generator coupled to the additional steam turbine). Thereafter, further expanded steam exiting the additional steam turbine condenses in condenser/vaporizer 43C of bottoming cycle B and produces organic motive fluid vapor which is supplied to organic motive fluid turbine 45C. The organic motive fluid vapor expands in the organic motive fluid turbine and electric power is produced preferably by an electric generator coupled thereto. Steam condensate produced by condenser/vaporizer 43C is supplied to pre-heater 47C in topping cycle A where heat depleted geothermal liquid or brine pre-heats the steam condensate thus completing the topping power cycle.

To provide an indication of operation of this option via a numerical example, the first steam turbine produces 14 MW (gross power) while the second steam turbine produces 4.7 MW (gross power) with the organic motive fluid turbine producing 9.8 MW (gross power). In this embodiment, substantially less geothermal fluid has been used compared to the embodiments described with reference to FIGS. 6A and 6B.

Figure 6C:
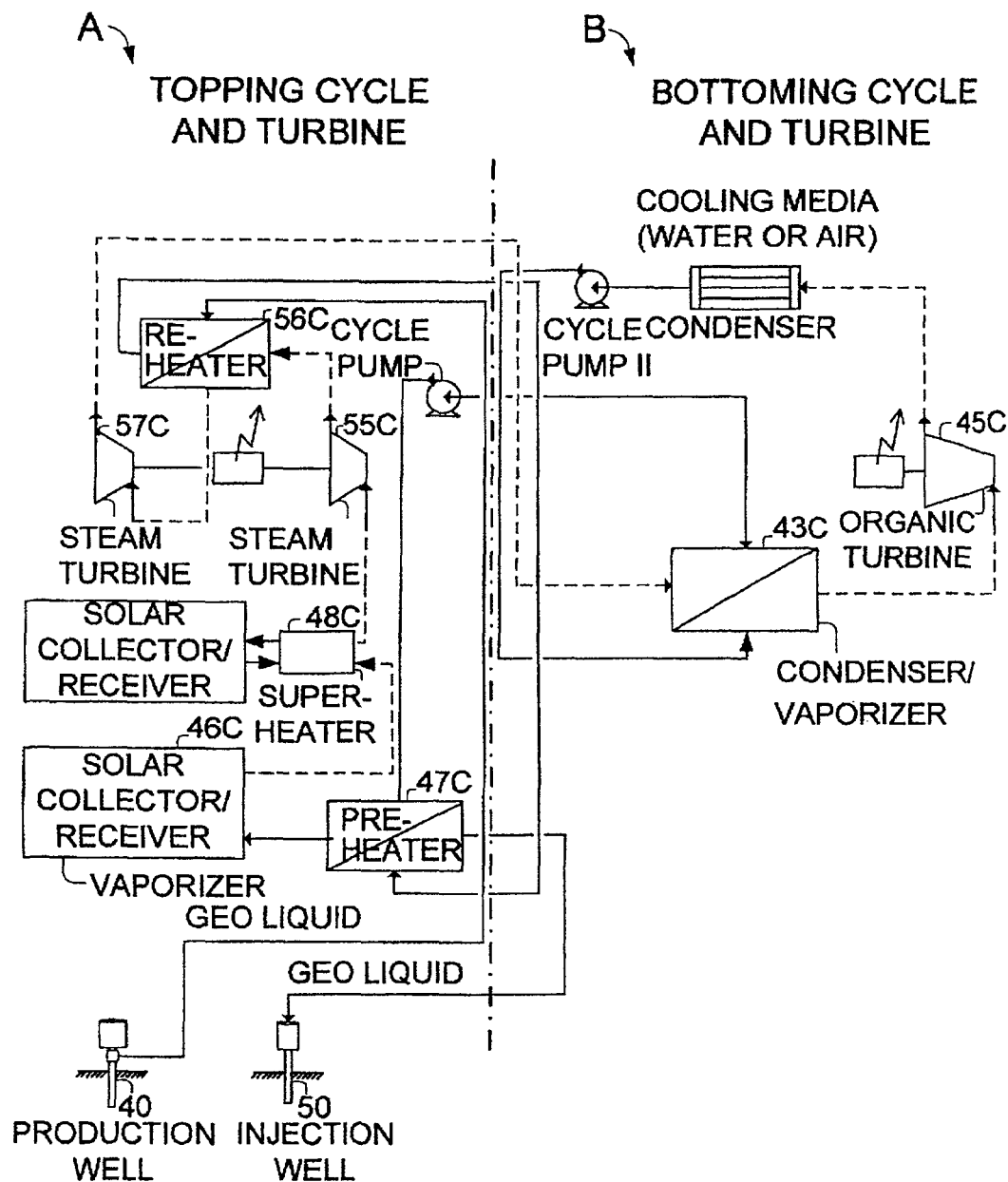
FIG. 6C is a schematic diagram illustrating an additional arrangement constructed and arranged in accordance with an embodiment of the present invention wherein collected solar energy heats a motive fluid for operating a separate topping cycle power plant wherein additional power is produced in a further bottoming cycle power plant operated by an additional motive fluid.
Figure 6D:
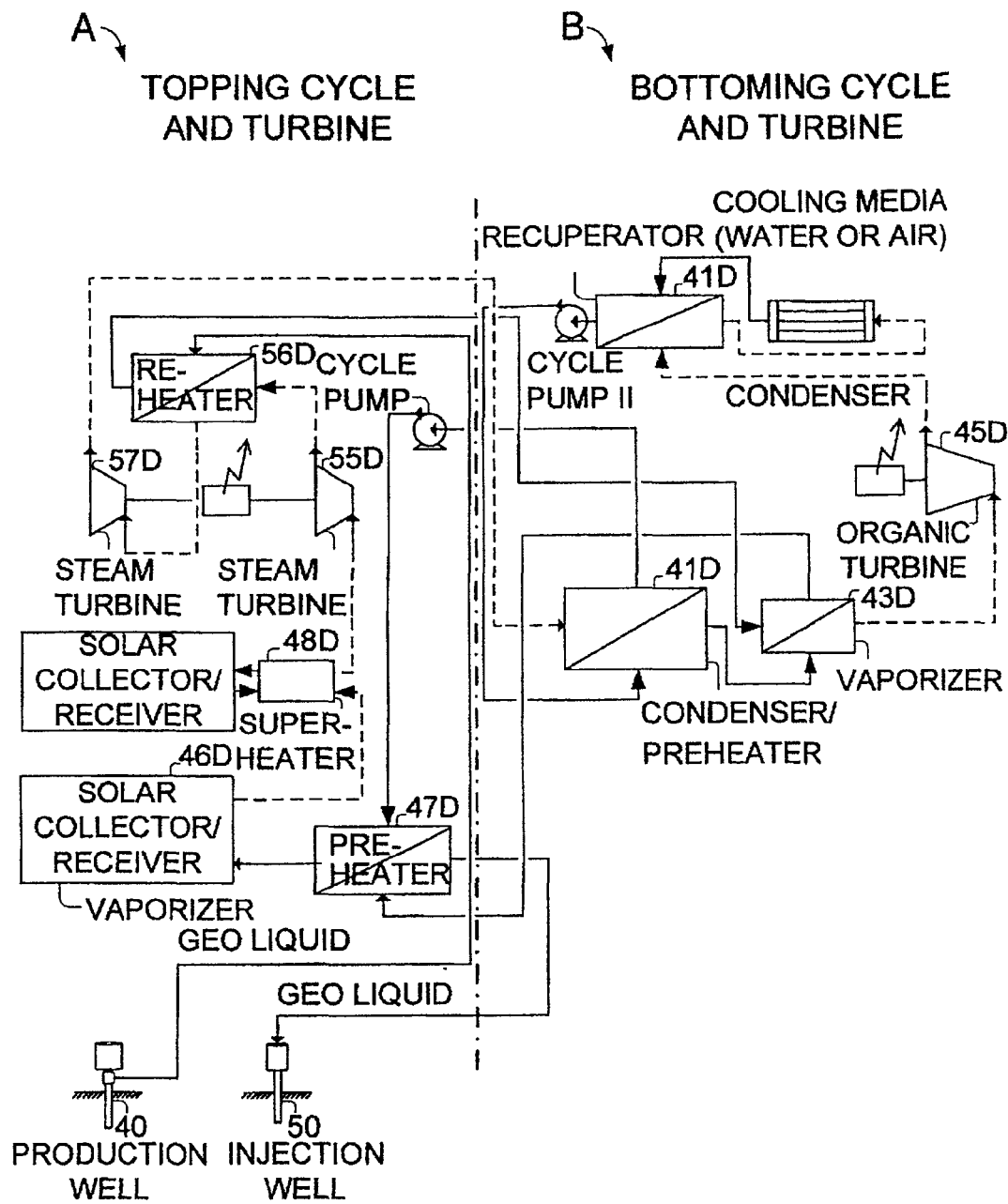
FIG. 6D is a schematic diagram illustrating a still further arrangement constructed and arranged in accordance with an embodiment of the present invention wherein collected solar energy heats a motive fluid for operating a separate topping cycle power plant wherein additional power is produced in a further bottoming cycle power plant operated by an additional motive fluid.

In a further option a higher temperature bottoming cycle is described with reference to FIG. 6D wherein the use of condenser/pre-heater 41D and vaporizer 43D together with recuperator 42D in the bottoming cycle permit additional electric power to be produced compared to the arrangement described with reference to FIG. 6C. Here, condenser/pre-heater 41D, which condenses further expanded steam exiting steam turbine 57D in topping cycle power plant A, pre-heats the organic motive fluid of bottoming cycle power plant B prior to supplying it to vaporizer 43D. Vaporized organic motive fluid produced in vaporizer 43D using heat from geothermal fluid supplied from re-heater 56D is supplied to organic vapor turbine 45D where it expands and power is produced by the electric generator preferably coupled to organic vapor turbine 45D of bottoming cycle power plant B (12.4 MW gross power). Expanded organic motive fluid exiting organic vapor turbine 45D is supplied to the condenser (which may be air cooled are water cooled) via recuperator 42D and organic motive fluid condensate is produced which is supplied to recuperator 42D where it is pre-heated by the expanded organic motive fluid exiting organic vapor turbine 45D. The pre-heated organic motive fluid is then supplied to condenser/pre-heater 41D thus completing the bottoming power cycle. Also in this embodiment, substantially less geothermal fluid has been used compared to the embodiments described with reference to FIGS. 6A and 6B. In a numerical example of the operation of this embodiment, steam turbine 57D produces 13.1 MW gross power while steam turbine 65D produces 4.9 MW.

In these last 4 options, effort has been made to optimize the use of the solar heat as well as the use of the geothermal heat so as to enable the reduction in the size of the solar collector field (up to about a 15% reduction in the size of the solar collector field) while operating at temperatures facilitating design and maintenance of the system and achieving increased energy conversion efficiencies for both geothermal and solar resources. Furthermore, in the embodiments described with reference to FIGS. 6C and 6D, a relatively simple system is used which in addition, permits relatively simple transition from day operation to evening and night operation.

Figure 7:
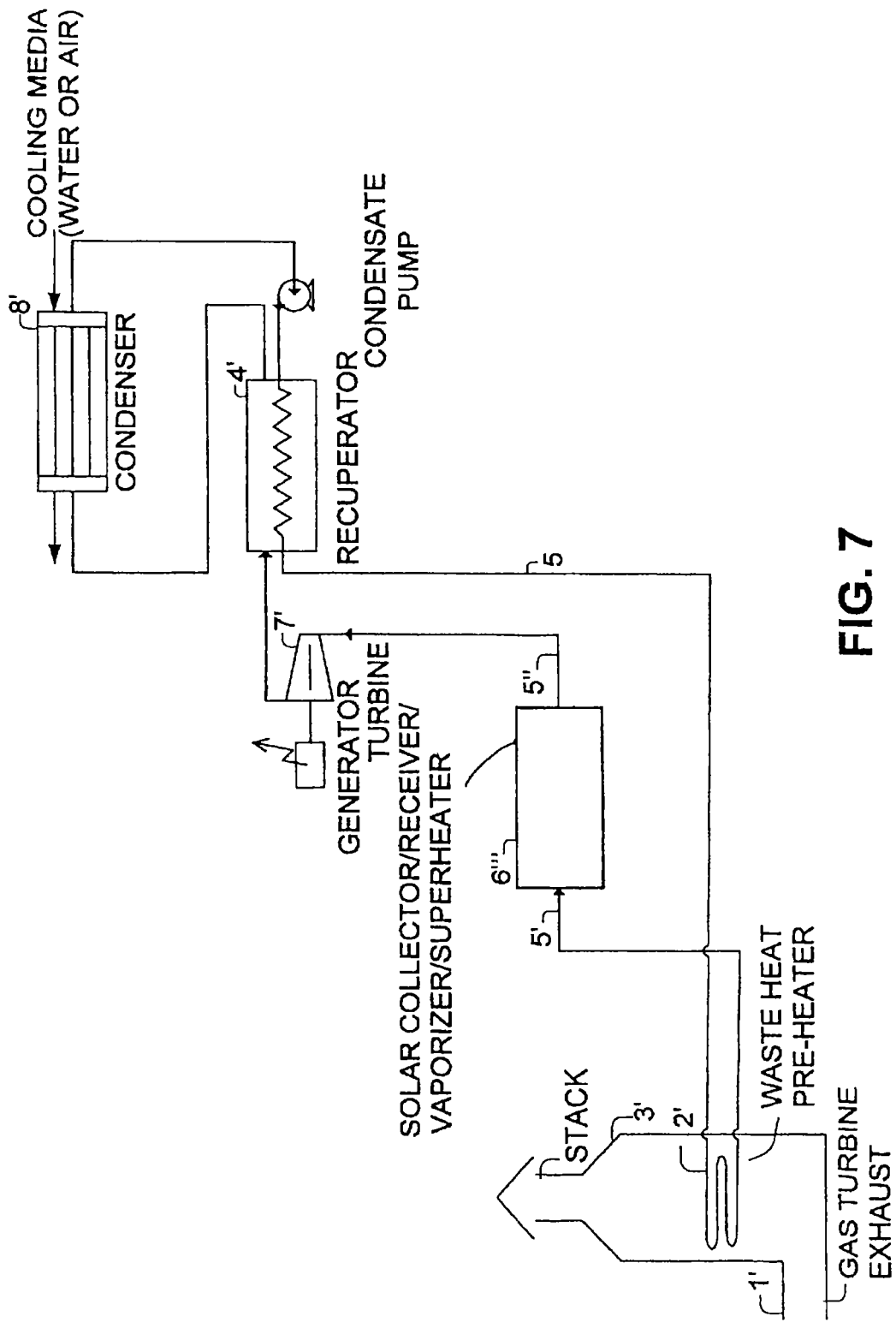
FIG. 7 is a schematic diagram of a system constructed and arranged in accordance with a preferred embodiment of the invention, in which the motive fluid is pre-heated by unused industrial heat streams and vaporized directly by solar energy.

Turning to a further embodiment of the present invention, FIG. 7 presents a simplified drawing of a system constructed and arranged in accordance with an additional embodiment of the present invention utilizing an unused industrial heat stream. Gas from gas turbine exhaust 1' supplies heat to motive fluid supplied to waste heat pre-heater 2'. The cooled gas turbine exhaust gas is disposed of via stack 3'. The organic motive fluid supplied from condenser 8', either directly or through recuperator 4' via line 5' is pre-heated in pre-heater 2' using gas from gas turbine exhaust 1' and the pre-heated motive fluid leaves the waste heat pre-heater through line 5' and is fed to solar collector/vaporizer 6''' where it is heated and boiled and also superheated. Motive fluid vapor produced is supplied through line 5" and fed to turbine 7 where it expands and produces electric power by driving an electric generator. Spent vaporized motive fluid exits turbine 7 and is supplied through recuperator 4', where the spent vaporized motive fluid heats motive fluid condensate, to condenser 8' for producing motive fluid condensate using air or water as the cooling medium. The motive fluid condensate is then supplied to the recuperator and the cycle is repeated.

Figure 8:
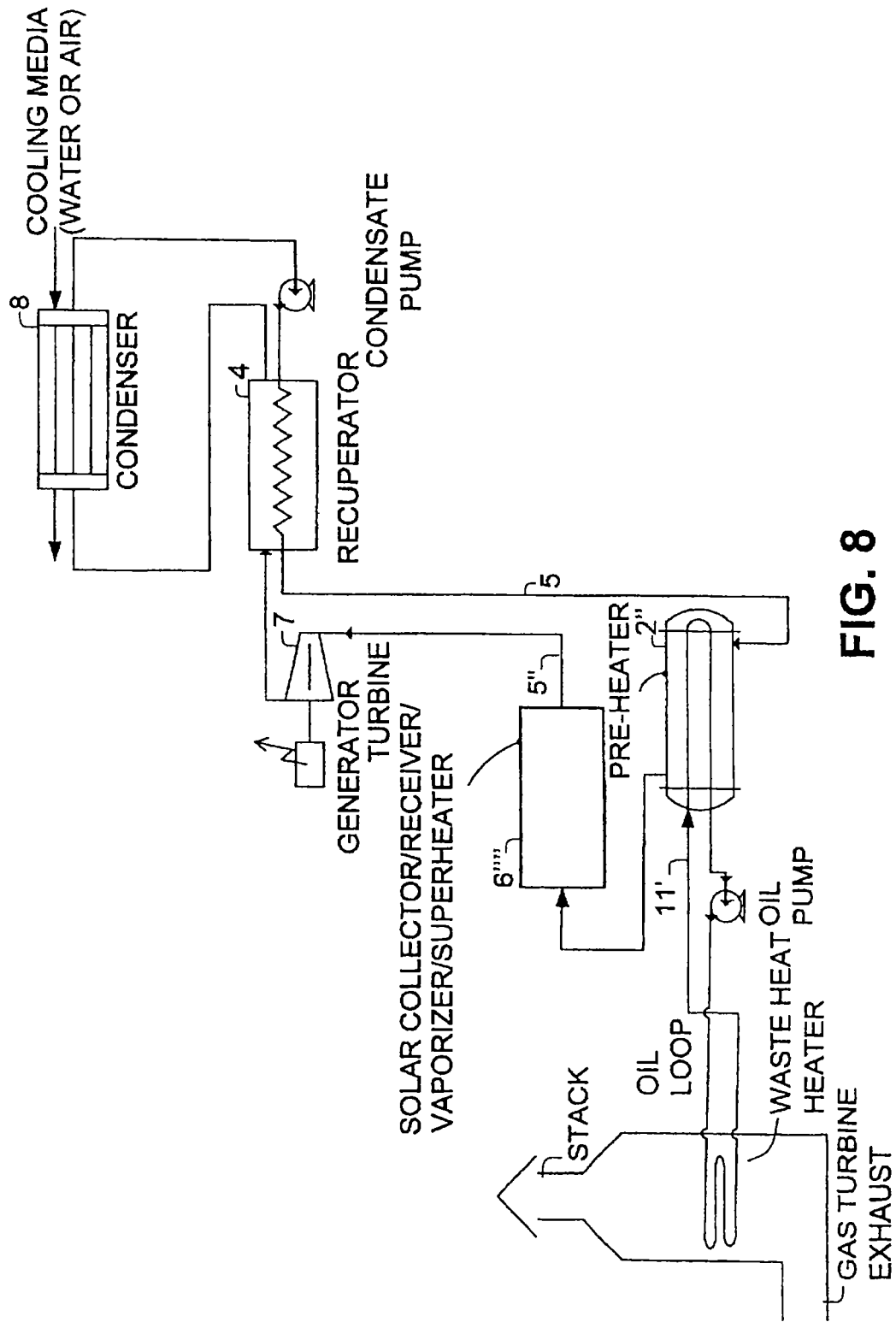
FIG. 8 is a schematic diagram of a another alternative system constructed and arranged in accordance with a further preferred embodiment of the invention, in which the motive fluid is pre-heated by unused industrial heat streams utilizing a thermal oil and vaporized directly by solar energy.

FIG. 8 shows a system which differs from the previous embodiment described with reference to FIG. 7 since the organic motive fluid is not directly heated by gas from the gas turbine exhaust; rather, gas from gas turbine exhaust 1" heats thermal oil, flowing in a closed heat transfer loop indicated in the figure by reference numeral 11', and heats organic motive fluid present in pre-heater 2". Thereafter, preheated motive fluid is supplied to solar collector/receiver 6"" through line 12' for vaporizing and also superheating the motive fluid. The vaporized motive fluid produced in vaporizer solar collector/receiver 6"" exits through line 5" and is supplied to turbine 7 for producing electric power.

Figure 9:
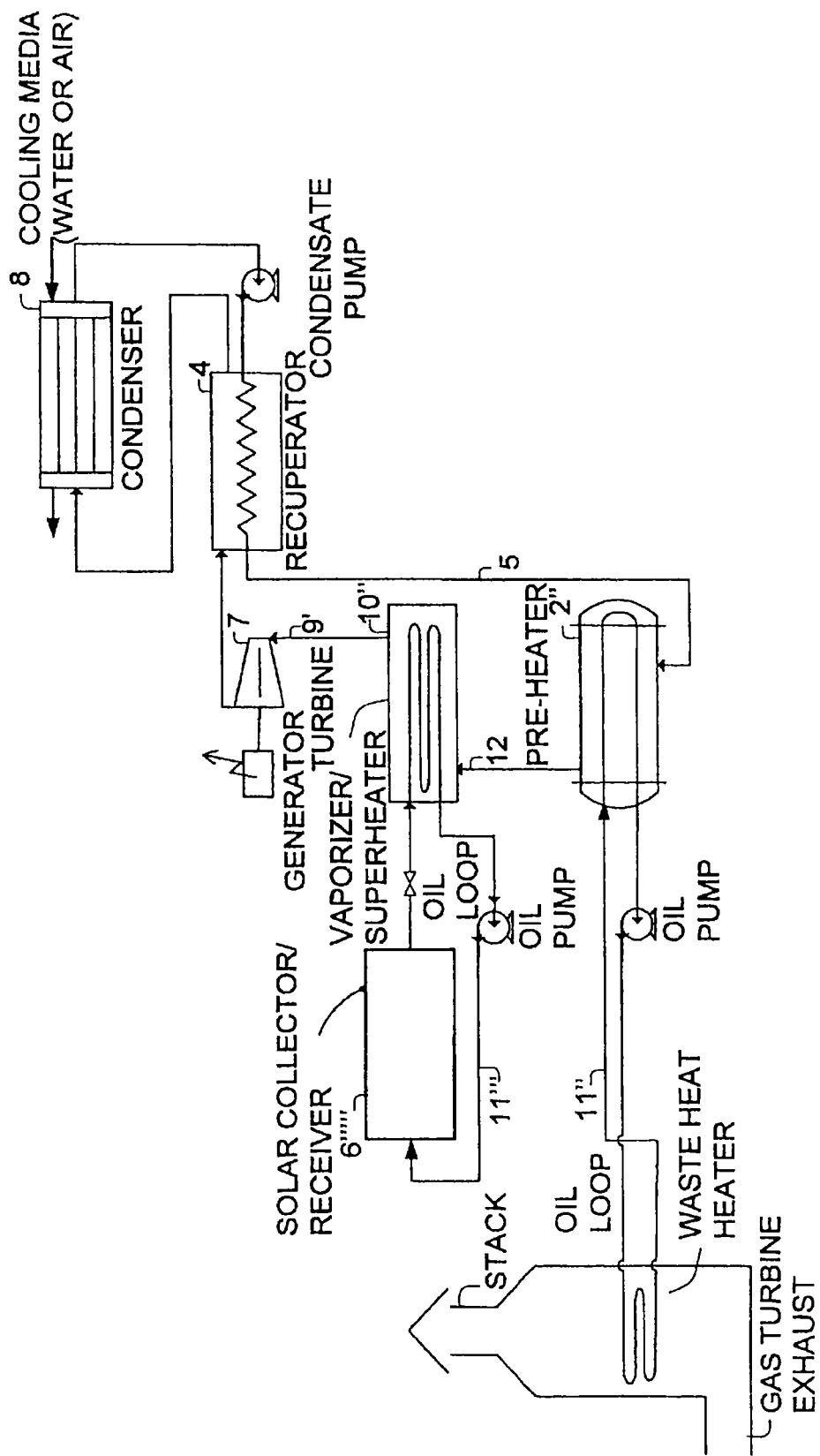
FIG. 9 is a schematic diagram of still another alternative system constructed and arranged in accordance with a further preferred embodiment of the invention, in which thermal oil is utilized to heat the organic motive fluid using unused industrial heat streams and vaporize and also superheat the organic motive fluid with heat from solar energy.

As far as FIG. 9 is concerned, a system is shown, which differs from the previous embodiments described with reference to FIGS. 7 and 8 since the organic motive fluid is not directly heated in the solar collector; rather, solar collector 6""" heats thermal oil, flowing in a closed heat transfer loop indicated in the figure by reference numeral 11", which heats the pre-heated organic motive fluid (flowing into vaporizer/superheater 10" through line 12). According to the system of the present embodiment, the heat exchanger used for heating the pre-heated organic motive fluid with thermal oil is incorporated in vaporizer/superheater 10". The vaporized motive fluid produced in vaporizer/superheater 10" exits through line 9' and is supplied to turbine 7 for producing electric power. In the present embodiment, solar collector 6""", shown in FIG. 9, will be larger than solar collectors 6''' and 6"" shown in FIGS. 7 and 8 respectively.

The following numeric example will illustrate the operation of the system utilizing an unused industrial heat stream and also described with reference to FIG. 9. It is assumed that the unused industrial heat stream or gas turbine exhaust gas is supplied from the gas turbine at a temperature of production well 1 at a temperature of 783° F. (417° C.). After transferring heat to thermal oil in the waste heat heater, the heat depleted gas turbine exhaust gas leaves the waste heat heater at 257° F. (about 125° C.). The heated thermal oil transfers 5550 kW heat to the motive fluid in pre-heater 2".

Thermal oil circulating in further oil loop 11''' is heated in solar collector 6""" and is fed to vaporizer/superheater 10" for supplying 3500 kW latent heat to organic motive fluid therein and producing organic motive fluid vapor at a temperature of about 400° F. (204° C.) which is supplied thereafter to turbine 7. Air, if used, is supplied to air-cooled condenser 8 at a temperature of 59° F. (15° C.). Under these operating conditions, economical operation is achieved and the electric power produced is 3,000 kW gross compared to 1,475 kW if solar collector/receiver 6""" were not used.

Figure 10:
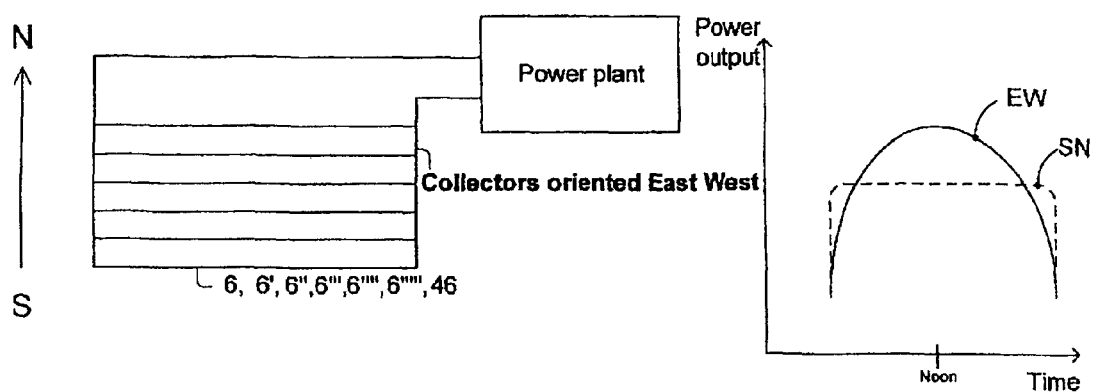
FIG. 10 shows an embodiment of a power plant constructed and arranged in accordance with the present invention, the solar collector being orientated in the east-west direction.
Figure 11:
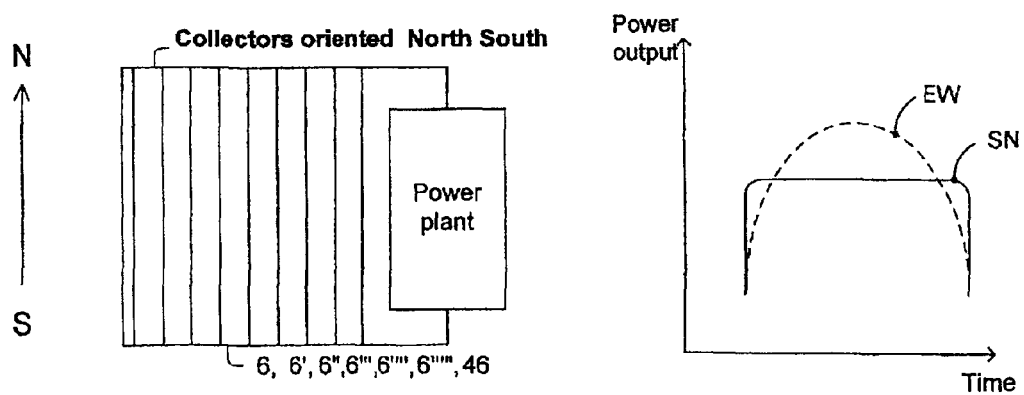
FIG. 11 shows a further embodiment of a power plant constructed and arranged in accordance with the present invention, the solar collector being orientated in north-south direction.

FIGS. 10 and 11 show embodiments of the present invention can comprising solar collectors, e.g. trough collectors, 6, 6', 6", 6''', 6"", 6""" and 46 (see FIGS. 1-9) orientated in the East-West (EW) direction (FIG. 10) or alternatively orientated in the North-South (NS) direction (see FIG. 11). As can be seen from FIGS. 10 and 11, EW orientated solar collectors provides a smoother operation for the power plant while the NS orientated solar collectors provide a more step like function operation of the power plant over the hours of the day. However, as described with reference to FIG. 2, the present invention still provides substantial operation of the solar portion of the power plant and reasonable power production levels even during the early hours and late hours of the day.

Figure 12A:
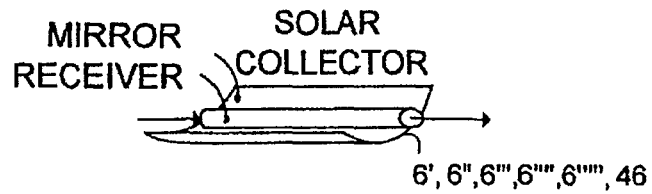
FIG. 12A shows a schematic diagram of a solar concentrating parabolic trough collector receiver system which is suitable for use in an embodiment of the present invention.
Figure 12B:
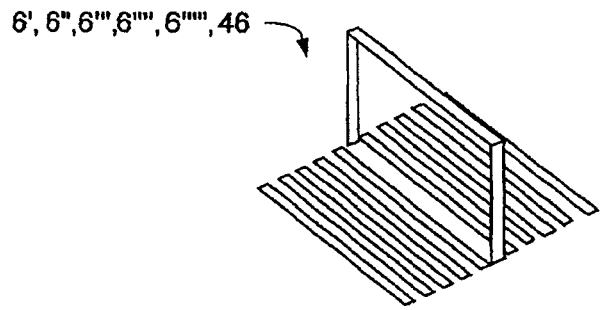
FIG. 12B shows a schematic diagram of a Fresnel type solar concentrating collector receiver system which is suitable for use in an embodiment of the present invention.
Figure 12C:
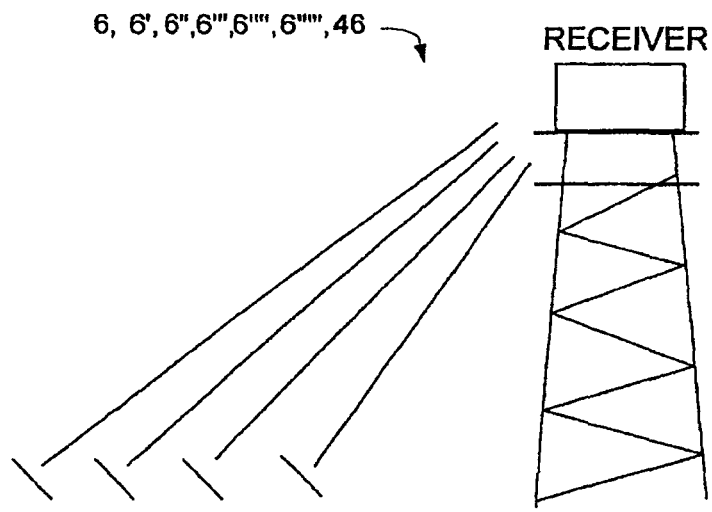
FIG. 12C shows a schematic diagram of a solar tower central tower solar concentrating collector receiver system which is suitable for use in an embodiment of the present invention.

In accordance with the present invention, basically any solar concentrating collector receiver system can be used in the embodiments of the present invention. E.g. solar parabolic trough collector receiver systems (see FIG. 12A) or solar Fresnel collector receiver system (see FIG. 12B), etc can be used as the solar collectors/receivers in the embodiments of the present invention previously described. Also, if preferred, solar heliostat collectors in a field (see FIG. 12C) for providing heat to a central receiver at the top of a solar tower, etc. can be used as the solar collectors/receivers in the embodiments of the present invention previously described.

Figure 13:
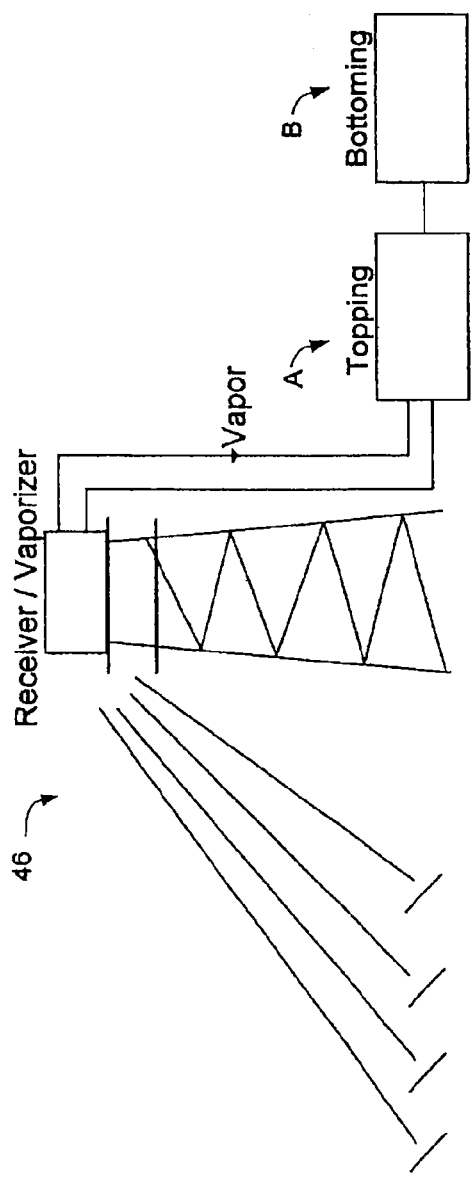
FIG. 13 shows a schematic diagram of a solar tower concentrating collector central receiver system which is suitable for use in the embodiment of present invention described with reference to FIG. 6.
Figure 14:
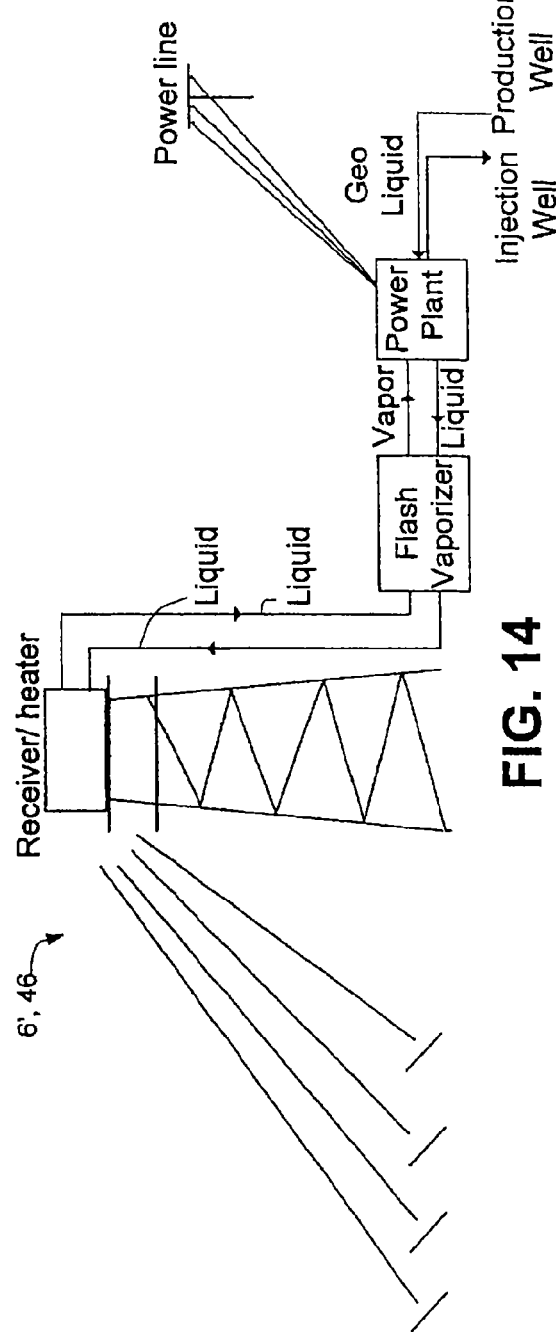
FIG. 14 shows a schematic diagram of another solar concentrating collector receiver system which is also suitable for use in the embodiment of present invention described with reference to FIG. 6.

Turning to FIG. 13, the vaporizer of the topping cycle (see FIG. 6) is located on the solar tower when using the solar heliostat collectors. If preferred, rather than locating the vaporizer of the topping cycle on the solar tower, a flash vaporizer can be located at ground level, while liquid is circulated to the receiver heater positioned on the solar tower, see FIG. 14. Such an arrangement is also suitable for use in the embodiment of the invention described with reference to FIG. 4 where flash vaporizer 10 would be located at ground level. In a further embodiment, see FIG. 15, a secondary mirror can be located at the top of the solar tower so that the radiation can be directed to a receiver located at ground level (beam-down). Such an arrangement can be used in the embodiments described with reference to FIGS. 12C, 13 and 14.

It should be appreciated that, while the invention is not limited to the use of marginal heat sources, it is also useful in such cases. In this respect, the above results show that, without the invention, the energy available from the low temperature geothermal fluid would not be exploited at all, since operating a power plant with low energy liquids coming from such sources would not commercially worthwhile. Thus, the invention allows exploiting sources that would otherwise go wasted.

Of course, from the engineering point of view, it is possible to operate a power plant using such low temperature geothermal fluid but, as explained above, this is not economical. However, now that, according to the present invention, a geothermal power plant is built in combination with apparatus operating on solar energy in the specific and novel way provided by the present invention, the economic barrier is overcome. Consequently, it is now possible to exploit low temperature geothermal fluid or liquid produced from such production wells even during hours when the intensity of the solar energy is relatively low or even when solar energy is not available, without causing the operation of the power plant to become uneconomical. In addition, the use of low temperature geothermal fluid, usually geothermal liquid or brine, for preheating the organic motive fluid provides a substantial amount of heat to the plant, permitting the solar system to be more compact and thus cheaper.

Figure 15:
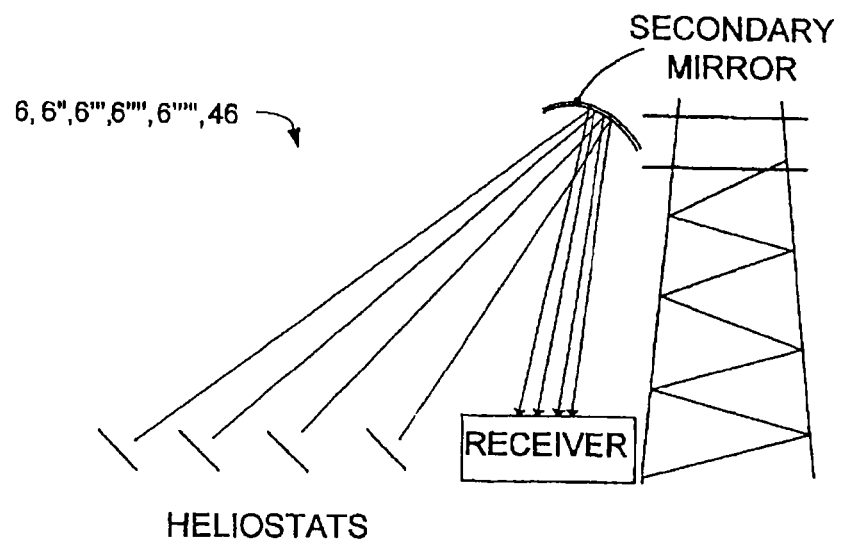
FIG. 15 shows a schematic diagram of a solar concentrating collector receiver system, having a secondary mirror so that the receiver is located on the ground, which is suitable for use in the embodiments of present invention described with reference to FIGS. 7C, 8 and 9.

As will be apparent to the skilled person, a variety of organic motive fluids can be preferably employed in the system of the invention, and the selection of a specific liquid to be used will depend on a number of considerations, such as the type and size of turbine and of the other equipment, the specific location of the power plant, which influences the amount of solar energy that can be exploited, and the number of hours during the day when solar energy is available. Illustrative examples of suitable motive fluids, but non-limiting, include isopentane, n-pentane, butane, propane, hexane, Terminol LT, DowthermJ and dodecane, and mixtures of two or more of such organic fluids. Furthermore, as far as the embodiments of the present invention describing a topping cycle and a bottoming cycle, e.g. FIG. 6, FIG. 13 and FIG. 15, are concerned, illustrative examples of suitable motive fluids, but non-limiting, for topping cycle A include Terminol LT, DowthermJ, dodecane, isopentane, n-pentane and water, while illustrative examples of suitable motive fluids, but non-limiting, for bottoming cycle B include isopentane, n-pentane, butane, propane, hexane. Note that Therminol LT is the commercial name for the alkyl substituted aromatic fluid of the Solutia Company having a center in Belgium. Dowtherm J, on the other hand, is the commercial name for a mixture of isomers of an alkylated aromatic fluid of the Dow Chemical Company being centered in the U.S.A.

Note that the numerical examples provided herein are based on conditions during summer in East Mesa, Calif., U.S.A for n-pentane. During other seasons, lower temperature operation will be achieved by the system of the present invention.

Of course, the systems described above only schematically exemplify the invention and different arrangements can be provided, without exceeding the scope of the claims. For example, more than one geothermal well producing geothermal fluid or liquid can be used in a cascaded system, which in turn may operate more than one turbine. Furthermore, while geothermal fluid, such as geothermal liquid or brine is previously mentioned, fluids or liquids used in conjunction with sources of hot dry rock or enhanced geothermal systems can also be used in the present invention. The skilled person will easily devise many different arrangements, as well as many variations in the equipment and apparatus used to carry out the invention.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. An apparatus for increasing the efficiency of a power plant by operating a multi-heat source power plant, comprising:
    a heat exchanger that transfers heat to an organic fluid from a heat source for heating the organic fluid;
    a thermal collector having access to heat from a further heat source comprising a solar collector, that transfers heat to said organic fluid, heated in said heat exchanger, to vaporize the organic fluid at a predetermined temperature; and
    a power generation cycle using said vaporized organic fluid as a motive fluid,
    wherein said thermal collector transfers heat from the further heat source to said organic fluid by use of a heat transfer loop capable of limiting the temperature of the heat from the further heat source that is transferred to said organic fluid such that the temperature of the organic fluid reaches the predetermined temperature.

2. The apparatus according to claim 1 wherein said power generation cycle includes a turbine and a condenser for condensing expanded motive fluid from said turbine.

3. The apparatus according to claim 1 further comprising means for supplying motive fluid condensate from said condenser to said heat exchanger.

4. The apparatus according to claim 1 wherein said heat exchanger comprises a preheater for preheating said motive fluid with heat from said heat source.

5. The apparatus according to claim 1 further comprising a preheater for preheating said motive fluid with heat from an industrial heat stream.

6. The apparatus according to claim 1 wherein said heat exchanger comprises a heat exchanger for heating said motive fluid with heat from said heat source.

7. The apparatus according to claim 1 wherein said apparatus for increasing the efficiency of a power plant by operating a multi-heat source power plant comprises means for utilizing an industrial heat stream.

8. The apparatus according to claim 1 wherein said heat source comprises an industrial heat stream.

9. The apparatus according to claim 1 wherein said organic motive fluid comprises pentane.

10. The apparatus according to claim 1 wherein said organic motive fluid comprises iso-pentane.

11. The apparatus according to claim 5 wherein said preheater preheats said motive fluid with heat from an industrial heat stream prior to heating the motive fluid with heat from said solar collector for heating and vaporizing said motive fluid.

12. The apparatus according to claim 11 wherein said preheater preheats said motive fluid by liquid to gas heat transfer from an industrial heat stream to the liquid motive fluid.

13. The apparatus according to claim 11 wherein said preheater preheats said motive fluid by liquid to gas heat transfer from an industrial heat stream at a temperature of about 400° C. to the liquid motive fluid.

14. The apparatus according to claim 1 wherein said power generation cycle includes a turbine and a further heat exchanger that transfers heat from said motive fluid to another fluid condensing said motive fluid exiting said turbine.

15. The apparatus according to claim 14 wherein said further heat exchanger that condenses motive fluid vapor exiting said turbine extracts heat from said motive fluid vapor and heats said another fluid.

16. The apparatus according to claim 1 wherein said heat source is a geothermal heat source.

17. An apparatus for increasing the efficiency of a power plant by operating a multi-heat source power plant, comprising:
    a heat exchanger that transfers heat to a fluid from a heat source for heating the fluid;
    a thermal collector having access to heat from a further heat source that transfers heat to said fluid at a temperature which is variable, to vaporize the fluid at a predetermined temperature; and
    a power generation cycle using said vaporized fluid as a motive fluid,
    wherein said thermal collector transfers heat from the further heat source to said fluid by use of a heat transfer loop capable of limiting the temperature of the heat from the further heat source that is transferred to said fluid such that the temperature of the fluid reaches the predetermined temperature.

18. The apparatus according to claim 17 wherein said further heat source is a solar heat source.

19. The apparatus according to claim 18 wherein said fluid is an organic fluid.

20. The apparatus according to claim 18 wherein said fluid is water.

21. The apparatus according to claim 18 wherein said heat transfer loop is an oil loop.

22. The apparatus according to claim 18 wherein said heat source is a geothermal heat source.

23. The apparatus according to claim 1 wherein said heat source is industrial waste heat.

24. The apparatus according to claim 1 wherein said heat exchanger that transfers heat to an organic fluid from a heat source heats the organic fluid to a first temperature.

25. The apparatus according to claim 24 wherein the predetermined temperature is higher than said first temperature.

26. The apparatus according to claim 17 wherein said heat exchanger that transfers heat to a fluid from a heat source heats the fluid to a first temperature.

27. The apparatus according to claim 26 wherein the predetermined temperature is higher than said first temperature.

* * * * *